(12) United States Patent
Gotoh et al.

(10) Patent No.: US 6,978,084 B2
(45) Date of Patent: Dec. 20, 2005

(54) RECORDING/REPRODUCTION METHOD SUITABLE FOR RECORDING/REPRODUCING AV DATA ON/FROM DISC, RECORDER AND REPRODUCER FOR THE METHOD, INFORMATION RECORDING DISC AND INFORMATION PROCESSING SYSTEM

(75) Inventors: Yoshiho Gotoh, Osaka (JP); Hiroshi Ueda, Hirakata (JP); Yoshihisa Fukushima, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 214 days.

(21) Appl. No.: 10/424,478

(22) Filed: Apr. 28, 2003

(65) Prior Publication Data

US 2003/0194217 A1 Oct. 16, 2003

Related U.S. Application Data

(63) Continuation of application No. 09/552,922, filed on Apr. 20, 2000, now Pat. No. 6,574,420, which is a continuation of application No. 09/077,473, filed on Aug. 10, 1998, now Pat. No. 6,292,625.

(30) Foreign Application Priority Data

Sep. 30, 1996 (JP) .................................. 8-258078

(51) Int. Cl.[7] .............................................. H04N 5/91
(52) U.S. Cl. ........................ 386/95; 386/125; 386/116
(58) Field of Search .............................. 386/46, 95, 96, 386/98, 104, 105, 111, 112, 113, 116, 125, 386/126

(56) References Cited

U.S. PATENT DOCUMENTS 4,774,700 A 9/1988 Sato et al.
5,111,444 A 5/1992 Fukushima et al.
5,119,291 A 6/1992 Flannagan et al.
5,128,810 A 7/1992 Halford
5,237,553 A 8/1993 Fukushima et al.
5,528,571 A 6/1996 Funahashi et al.
5,623,470 A 4/1997 Asthana et al.
5,805,550 A 9/1998 Ohmori
5,818,654 A 10/1998 Reddy et al.
5,848,438 A * 12/1998 Nemazie et al. ............ 711/201
5,914,928 A * 6/1999 Takahashi ................ 369/47.14
5,966,495 A 10/1999 Takahashi et al.
6,031,804 A 2/2000 Yamamuro
6,075,920 A 6/2000 Kawamura et al.

(Continued)

FOREIGN PATENT DOCUMENTS

EP 0 300 264 1/1989

(Continued)

OTHER PUBLICATIONS

"Universal Disk Format Specification", Optical Storage Technology Association, Revision 1.02, pp. 28 and 29, Aug. 30, 1996.

*Primary Examiner*—Huy Nguyen
(74) *Attorney, Agent, or Firm*—RatnerPrestia

(57) ABSTRACT

The present invention relates to a method for recording an AV file using an information recording disk in which data is recorded/reproduced by sectors. The recording method includes the steps of: determining whether or not input data is AV data; detecting a defective sector existing in an assigned data recording area; when the input data is AV data while a defective sector is detected in the data recording area, allocating a defective extent including the defective sector; recording AV data in continuous sectors while skipping the defective extent; and allocating an area of continuous sectors where only the AV data is recorded as one AV extent.

6 Claims, 23 Drawing Sheets

U.S. PATENT DOCUMENTS

| | | | |
|---|---|---|---|
| 6,128,434 A | 10/2000 | Hirayama et al. | |
| 6,282,365 B1 | 8/2001 | Gotoh et al. | |
| 6,292,625 B1 | 9/2001 | Gotoh et al. | |

FOREIGN PATENT DOCUMENTS

| | | |
|---|---|---|
| EP | 0 730 368 | 9/1996 |
| JP | 1-244557 | 9/1989 |
| JP | 4-28061 | 1/1992 |
| JP | 4-141721 | 5/1992 |
| JP | 5-342759 | 12/1993 |
| JP | 6-103577 | 4/1994 |
| JP | 6-342579 | 12/1994 |
| JP | 7-175592 | 7/1995 |
| JP | 8-212707 | 8/1996 |
| JP | 8-212708 | 8/1996 |
| WO | WO96/08010 | 3/1996 |

\* cited by examiner

1 ECC corresponds to 16 sectors

FIG. 9

| LBN | Before AV file recording | After AV file recording | |
|---|---|---|---|
| 592 to 1599 | First continuous area (Unallocated) | AV file extent A (AV extent) | ← ECC boundary<br>Recording<br>← ECC boundary |
| 1600 to 1615 | | (LBN1600:error sector)<br>Skipped extent S (Defective extent) | Skipping<br>← ECC boundary |
| 1616 to 3567 | | AV file extent B (AV extent) | Recording<br>← ECC boundary |
| 3568 to 3584 | Unallocated | Unallocated | |
| 3585 | File entry:file B | File entry:file B | |
| 3586 to 3887 | File B | File B | |
| 3888 to 6395 | Second continuous area (Unallocated) | AV file extent C (AV extent) | ← ECC boundary<br>Recording |
| 6396 to 6399 | | Terminal extent E (Padding extent) | |
| 6400 to end | | Unallocated | ← ECC boundary |

▢ : AV file

FIG.10

Allocation descriptor

| RBP | Length | Field name | Content |
|---|---|---|---|
| 0 | 4 | Extent length | Unit32 |
| 4 | 4 | Extent location | Unit32 |

FIG.11A

Interpretation of upper 2 bits of extent length of allocation descriptor (Non-AV file)

| Value | Interpretation |
|---|---|
| 0 | Allocated and recorded extent |
| 1 | Allocated and unrecorded extent |
| 2 | Reserved |
| 3 | The extent is the following extent of allocation descriptors |

FIG.11B

Interpretation of upper 2 bits of extent length of allocation descriptor (AV file)

| Value | Interpretation |
|---|---|
| 0 | Allocated and recorded extent (AV extent) |
| 1 | Allocated and unrecorded extent (Padding extent) |
| 2 | Skipped unrecorded extent (Defective extent) |
| 3 | The extent is the following extent of allocation descriptors |

FIG.13

| LBN | Before AV file recording | Recording AV reserved file | After AV file recording |
|---|---|---|---|
| 590 | Unallocated | File entry:AV reserved file | Unallocated |
| 591 | | Unallocated | File entry:AV file |
| 592 to 1599 | First continuous area (Unallocated) | Extent K for AV reserved file (Allocated) | AV file extent A (AV extent) |
| 1600 to 1615 | | | (LBN1600:error sector) Skipped extent S (Defective extent) |
| 1616 to 3567 | | | AV file extent B (AV extent) |
| 3568 to 3584 | Unallocated | Unallocated | Unallocated |
| 3585 | | File entry:file B | File entry:file B |
| 3586 to 3887 | File B | File B | File B |
| 3888 to 6395 | Second continuous area (Unallocated) | Extent L for AV reserved file (Allocated) | AV file extent C (AV extent) |
| 6396 to 6399 | | | Terminal extent E (Padding extent) |
| 6400 to end | | | Unallocated |

 : AV file

FIG. 23

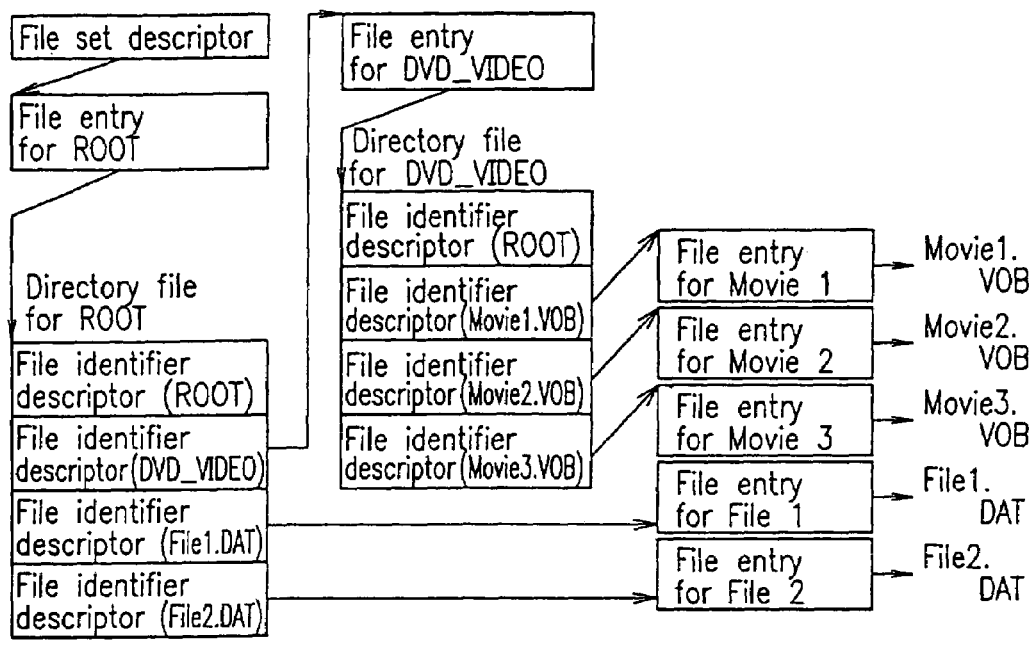

File identifier descriptor for directory

| Management information |
| Identification information (Directory) |
| Directory name length |
| File entry address |
| Information for extension |
| Directory name |

File identifier descriptor for file

| Management information |
| Identification information (File) |
| Directory name length |
| File entry address |
| Information for extension |
| File name |

FIG.25

ICB tag of file entry

| RBP | Length | Field name | Content |
|---|---|---|---|
| 0 | 4 | Number of previously recorded direct entries | Unit32 |
| 4 | 2 | Strategy type | Unit16 |
| 6 | 2 | Strategy parameter | Unit16 |
| 8 | 2 | Maximum number of entries | Unit16 |
| 10 | 1 | Reserved | 00h byte |
| 11 | 1 | File type | Unit8 |
| 12 | 6 | Parent ICB location | 1b_addr |
| 18 | 2 | Flag | Unit16 |

FIG.26

Flag fields of ICB tag

| Bit | Description | Remarks |
|---|---|---|
| 0-2 | Type of allocation descriptor | |
| 3 | Directory sort | |
| 4 | Non-relocatable | |
| 5 | Archive | |
| 6 | Setuid | |
| 7 | Setgid | |
| 8 | Sticky | |
| 9 | Contiguous | AV attribute bit indicating AV file |
| 10 | System | |
| 11 | Transformed | |
| 12 | Multi-version | |
| 13-15 | Reserved | |

RECORDING/REPRODUCTION METHOD SUITABLE FOR RECORDING/REPRODUCING AV DATA ON/FROM DISC, RECORDER AND REPRODUCER FOR THE METHOD, INFORMATION RECORDING DISC AND INFORMATION PROCESSING SYSTEM

This application is a continuation of U.S. patent application Ser. No. 09/552,922 filed Apr. 20, 2000 now Pat. No. 6,574,420 which is a continuation of U.S. patent application Ser. No. 09/077,473 filed Aug. 10, 1998 now U.S. Pat. No. 6,292,625.

TECHNICAL FIELD

The present invention relates to an information recording disk for recording digital data including AV data, a recording method, a reproduction method and a recording apparatus therefor, and an information processing system thereof.

BACKGROUND ART

There are optical disks for recording information such as computer data, e.g., PDs. PD is a rewritable optical disk which employs the phase change system and performs recording and reproduction of data by sectors.

A problem associated with rewritable optical disks is that data recording and reproduction cannot be ensured for every sector due to dust attached to the disk, a scratch on the disk, deterioration of the disk material itself from repeated recording operations, or the like. Such a sector, from which data cannot be normally recorded/reproduced, is called a defective sector. Such a defective sector is typically replacement-recorded based on a linear replacement algorithm.

The linear replacement algorithm is a system where a large number of spare areas are provided in a particular area on the disk so as to replacement-record data to an appropriate sector in the spare area when a defective sector is detected, thereby ensuring the reliability of input data.

In recent years, AV processing environments have been improved in personal computer apparatuses, and it is becoming more common to enjoy audio/video titles with a personal computer apparatus using a CD-ROM, or the like, in which AV data is recorded as being compressed based on a system such as the MPEG system.

However, since the conventional rewritable optical disk and the disk drive apparatus therefor are designed while assuming the use for recording/reproducing computer data, there are various problems when recording/reproducing AV data having different characteristics from those of computer data.

Typically, there is a problem that continuous video reproduction cannot be ensured when reproducing AV data. This is because a defective sector detected during the recording of the AV data is replacement-recorded using a conventional defect management method, whereby the continuous reproduction of AV data is hampered by a delay associated with an access to the spare area during data reproduction.

This problem is particularly conspicuous in the case of the above-described linear replacement algorithm. For example, when a defective sector occurs in the innermost area of the disk while the spare area is provided in the outermost area of the disk, the head moves from the inner area of the disk to the outer area of the disk in accessing the spare area, thereby resulting in a seek time of several hundred milliseconds. Since picture reproduction of video at 30 frames per second is required, if such a seek time as long as several hundred milliseconds is generated, the reproduced images will consequently be interrupted.

A problem in AV data recording is that it is necessary to provide a variety of recording methods. For example, AV data to be transmitted in real time via a broadcast wave, or the like, has to be recorded on the disk in real time. On the other hand, when high quality AV, data to be downloaded via the internet, or the like, is asynchronously recorded on the disk, the real time recording is not necessary, but data recording with high reliability is required.

The present invention has been made in view of the above problems and has an objective of providing method and apparatus for recording data which enable real time recording of AV data to a rewritable optical disk and continuous reproduction of the recorded AV data, a reproduction method, a reproduction apparatus and an information recording disk therefor, and an information processing system composed thereof.

BRIEF SUMMARY OF THE INVENTION

A recording method of the present invention is a recording method for recording an AV file including AV data using an information recording disk in which data is recorded/reproduced by sectors, the recording method including the steps of: determining whether or not input data is AV data; detecting a defective sector existing in a data recording area assigned for recording the input data; when it is determined that the input data is the AV data and a defective sector is detected in the data recording area, allocating a defective extent including the defective sector; recording the AV data in continuous sectors while skipping the defective extent;, and allocating an area of continuous sectors where only the AV data is recorded as one AV extent, wherein an AV file is recorded on the information recording disk, wherein the AV file includes: a defective extent, which includes, when a defective sector is included in the data recording area, the defective sector; and one or more AV extents each including a plurality of continuous sectors, thereby realizing the above-described objective.

Only a sector where an address error is detected during a data recording operation may be detected as the defective sector.

The defective sector may include a sector where an address error is detected during a data recording operation and a sector where a data error is detected during a data verification operation.

When using an information recording disk where an ECC block has a plurality of sectors, the defective extents may be allocated by ECC blocks.

When using an information recording disk where an ECC block has a plurality of sectors, the method may further include the step of allocating, in the AV file, a padding extent which does not include AV data.

The method may further include the step of recording attribute information for identifying the AV file including AV data, as part of file management information.

The method may further include the step of recording attribute information for identifying the defective extent and the AV extent, as part of file management information, in such a format that the attribute information is in one-to-one correspondence with the respective extents forming an AV file.

A recording apparatus of the present invention is a recording apparatus for recording AV data on an information recording disk in which data is recorded/reproduced by sectors, the recording apparatus including: a section for determining whether or not input data is AV data; a section for detecting a defective sector existing in a data recording area assigned for recording the input data; and a section for recording the AV data in continuous sectors while skipping the defective sector, wherein AV data is recorded in a plurality of continuous sectors on the information recording disk while skipping a defective sector existing in the data recording area, thereby realizing the above-described objective.

Only a sector where an address error is detected during a data recording operation may be detected as the defective sector.

The defective sector may include a sector where an address error is detected during a data recording operation and a sector where a data error is detected during a data verification operation.

When using an information recording disk where an ECC block has a plurality of sectors, the defective sectors may be skipped by ECC blocks each including the defective sector.

An information processing system of the present invention is an information processing system including: the above-described recording apparatus; and a control device for controlling the recording apparatus, the information processing system including: a section for allocating, in recording of an AV file, a defective sector detected by the recording apparatus as a defective extent; and a section for allocating continuous sectors where only AV data is recorded by the recording apparatus as an AV extent, wherein an AV file is recorded on the information recording disk, the AV file including: a defective extent, which includes, when a defective sector is included in the data recording area, the defective sector; and one or more AV extents each including a plurality of continuous sectors, thereby realizing the above-described objective.

When using an information recording disk where an ECC block has a plurality of sectors, the control device may allocate the defective extent by ECC blocks each including a defective sector.

When using an information recording disk where an ECC block has a plurality of sectors, the control device may further include a section for allocating a padding extent which does not include AV data, as part of the AV file.

The control device may further include a section for recording attribute information for identifying the AV file including AV data, as part of file management information.

The control device may further include a section for recording attribute information for identifying the defective extent and the AV extent, as part of file management information, in such a format that the attribute information is in one-to-one correspondence with the respective extents forming an AV file.

The control device may include a section for setting in the recording apparatus an acceptable value for the total number of sectors skipped when a defective sector is detected during a recording operation for AV data; and the recording apparatus may include a section for, after AV data has been recorded while skipping defective sectors within a range not exceeding the acceptable value, informing the control device of location information of all the sectors skipped during a recording operation for AV data.

The recording apparatus may include a section for, each time a defective sector is detected during a recording operation for AV data, informing the control section of the detection of the defective sector along with location information of the defective sector; and the control section may include a section for setting in the recording apparatus a new recording start location for AV data each time the detection of the defective sector is informed.

A reproduction method of the present invention is a reproduction method for performing data reproduction from the information recording disk on which the AV file is recorded using the above-described recording method, the method including the step of, in an AV data reproduction operation from the AV extent, performing a continuous data reproduction operation while neglecting location information of a replacement-recorded defective sector and not performing a recovery process even when an error occurs during data reproduction, thereby realizing the above-described objective.

A reproduction apparatus of the present invention is a reproduction apparatus for performing data reproduction from the information recording disk on which the AV file is recorded using the above-described recording method, the apparatus including a section for, in an AV data reproduction operation from the AV extent, performing a continuous data reproduction operation while neglecting location information of a replacement-recorded defective sector and not performing a recovery process even when an error occurs during data reproduction, thereby realizing the above-described objective.

An information recording disk of the present invention is an information recording disk in which an AV file including AV data is recorded/reproduced by sectors, wherein the AV file includes: a defective extent, which includes, when a defective sector is included in the data recording area assigned for file recording, the defective sector; and one or more AV extents recorded in a plurality of continuous sectors where only the AV data is recorded, thereby realizing the above-described objective.

Only a sector where an address error may be detected during a data recording operation is regarded as the defective sector.

The defective sector may include a sector where an address error is detected during a data recording operation and a sector where a data error is detected during a data verification operation.

When using an information recording disk where an ECC block has a plurality of sectors, the defective extents may be allocated by ECC blocks.

When using an information recording disk where an ECC block has a plurality of sectors, the AV file may include a padding extent which does not include AV data.

Attribute information for identifying the AV file including AV data may be further recorded as part of file management information.

Attribute information for identifying the defective extent and the AV extent may be further recorded, as part of file management information, in such a format that the attribute information is in one-to-one correspondence with the respective extents forming an AV file.

BRIEF DESCRIPTION OF THE DRAWINGS

FIG. 9 is a diagram illustrating how an AV file is recorded.

FIG. 10 is a diagram illustrating a data structure of an allocation descriptor.

FIGS. 11A and 11B are each a diagram illustrating interpretation of the upper two bits of an extent length included in the allocation descriptor.

FIG. 13 illustrates a data structure for free area management in AV file recording.

FIG. 23 is a diagram illustrating a data structure and logical relationship of the primary file management information defined by the ISO 13346 standard.

FIG. 25 is a diagram illustrating a data structure of the ICB tag.

FIG. 26 is a diagram illustrating a data structure of flag fields included in an ICB tag.

DETAILED DESCRIPTION OF THE INVENTION (Embodiment 1)

Hereinafter, a rewritable optical disk, and a data recording method and a data reproduction method therefor will be described as an example of the present invention.

(1) Optical Disk (1-1) Physical Structure

Referring to FIGS. 4A to 4D, 5, 6 and 7, the physical structure of a DVD-RAM disk, which is a rewritable optical disk, will be described.

Figure 4A:
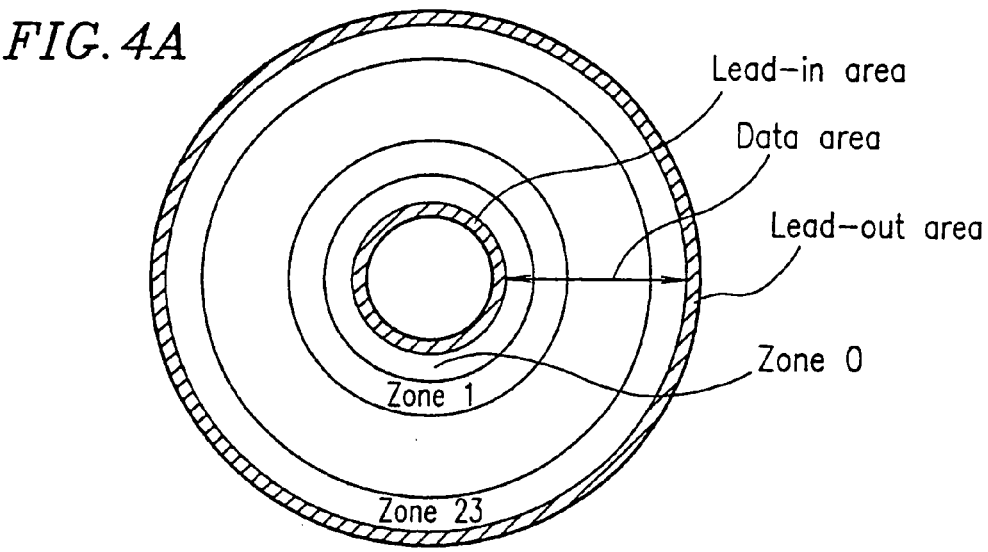
FIGS. 4A to 4D are each a diagram illustrating a physical structure of an optical disk such as a DVD-RAM.

FIGS. 4A to 4D are diagrams each illustrating the physical structure of a DVD-RAM disk. As illustrated in FIG. 4A, the DVD-RAM disk includes, from the inner area thereof, a lead-in area, a data area and a lead-out area. Digital data is recorded in each area and is managed in units called sectors.

Figure 6:
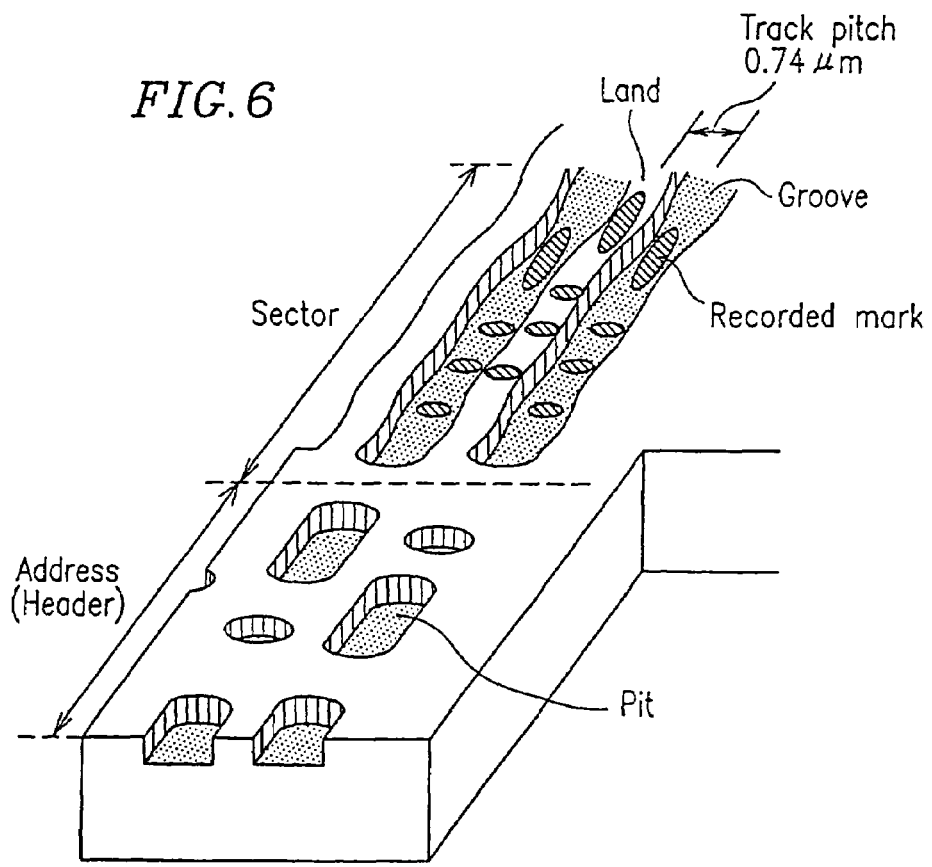
FIG. 6 is a diagram illustrating a physical sector structure.
Figure 7:
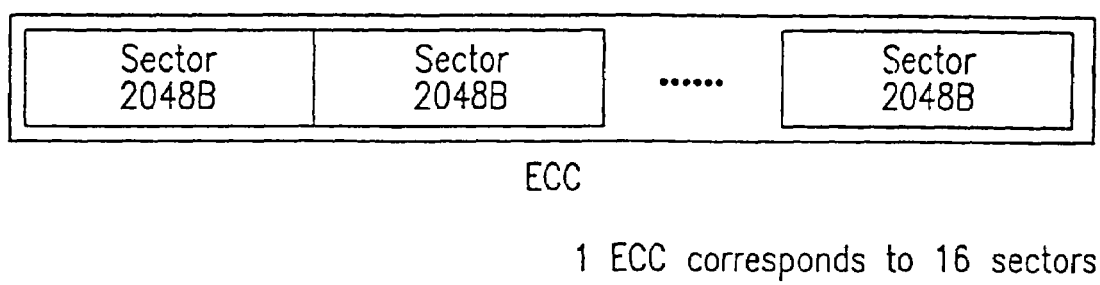
FIG. 7 is a diagram illustrating a structure of an ECC block.

FIG. 6 illustrates a structure of a sector. Data to be recorded in each sector is optically recorded as a recording mark on the land and groove portions based on a phase change recording system, and the physical address corresponding to each sector is physically recorded as pits in the header region. Two Kbytes of data are stored in the sector. Moreover, as illustrated in FIG. 7, an ECC (Error Correcting Code) operation is performed for each group of 16 sectors by providing a parity code thereto for the purpose of error correction. Hereinafter, such a group will be referred to as an ECC block.

Herein, it should be noted that the rewritable information capacity is doubled in the DVD-RAM by allowing data to be written on the groove portion, as well as on the land portion, thus being a disk medium better suited for recording video information.

Figure 4B:
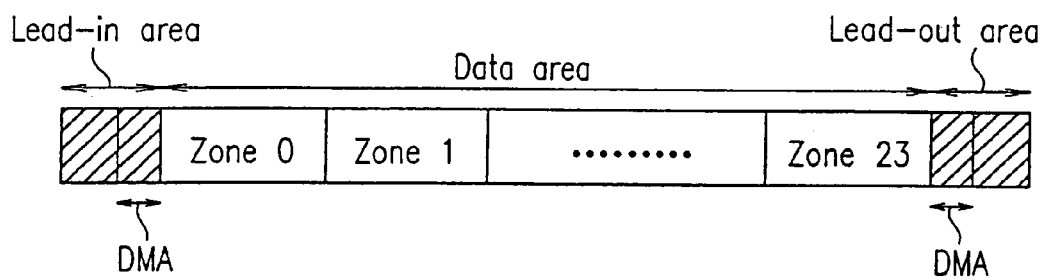

As illustrated in FIG. 4B, a data area is further divided into 24 zones numbered from 0 to 23, and data is recorded in each zone by physical sectors each of 2048 bytes. Moreover, as illustrated in FIG. 4B, a defect management area (DMA) is provided in the lead-in area and in the lead-out area, and the replacement location information of an ECC block, which has been replaced based on the linear replacement algorithm, will be recorded therein.

Figure 4C:
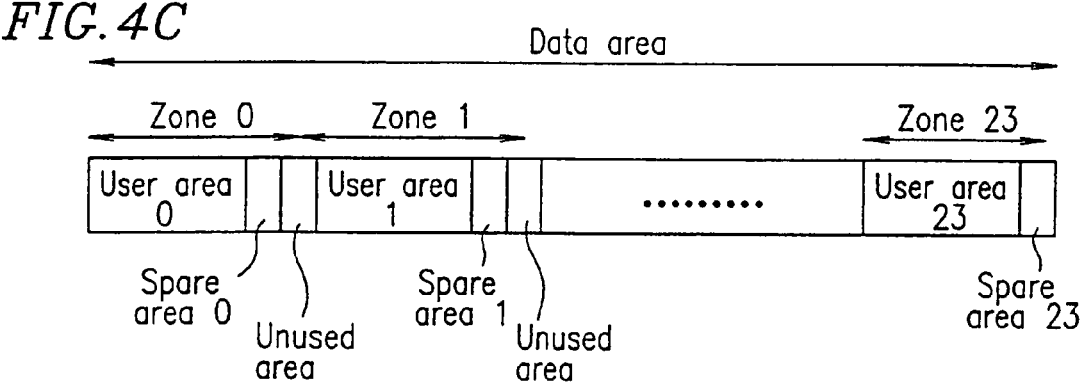
Figure 4D:
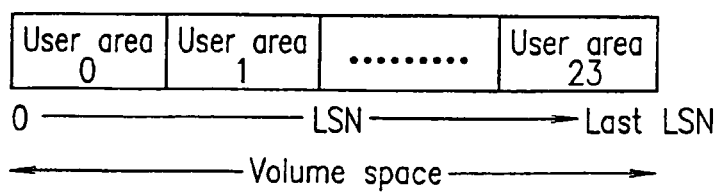

As illustrated in FIG. 4C, each zone in the data area is composed of a user area for recording user data and a replacement region for replacing a defective sector. Logical sector numbers (LSNs) are assigned to the physical sectors in the user areas, starting from the inner area. Thus, a volume area for recording user data is formed, as illustrated in FIG. 4D.

Figure 5:
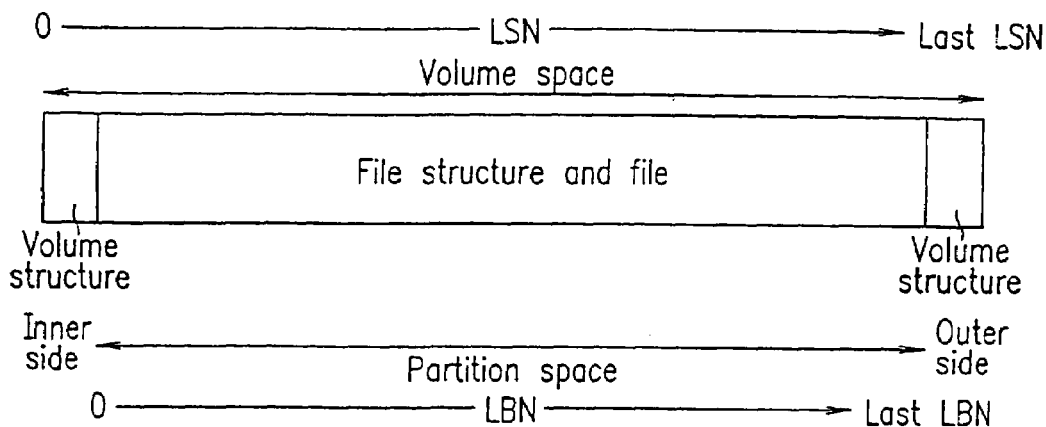
FIG. 5 is a diagram illustrating a structure of a volume space.

FIG. 5 illustrates the structure of a volume space including the user areas of the respective zones, wherein volume structures for handling the disk as a logical volume are provided respectively in the inner area and in the outer area, while a partition space is allocated therebetween, in which files are recorded by a user. In the partition space, logical block numbers (LBNs) are assigned to the respective sectors, starting from the leading sector thereof.

(1-2) File System Structure

Next, referring to FIGS. 3, 8, 10, 11A and 11B, a file system structure of the DVD-RAM will be described. The file system is a data structure for managing data recorded by sectors as files and directories. The file system of the present embodiment is in conformity with the file system defined by the ISO/IEC 13346 standard.

Figure 8:
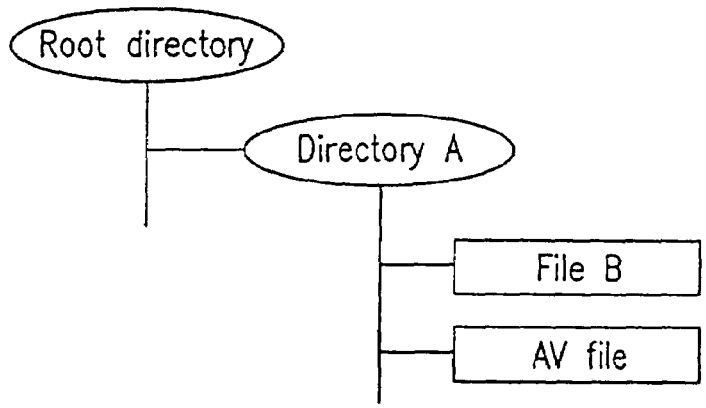
FIG. 8 is a diagram illustrating a directory structure.

FIG. 8 illustrates a directory structure after an AV file is recorded. Directory A is under the root directory, while file B and an AV file are under directory A.

Figure 3:
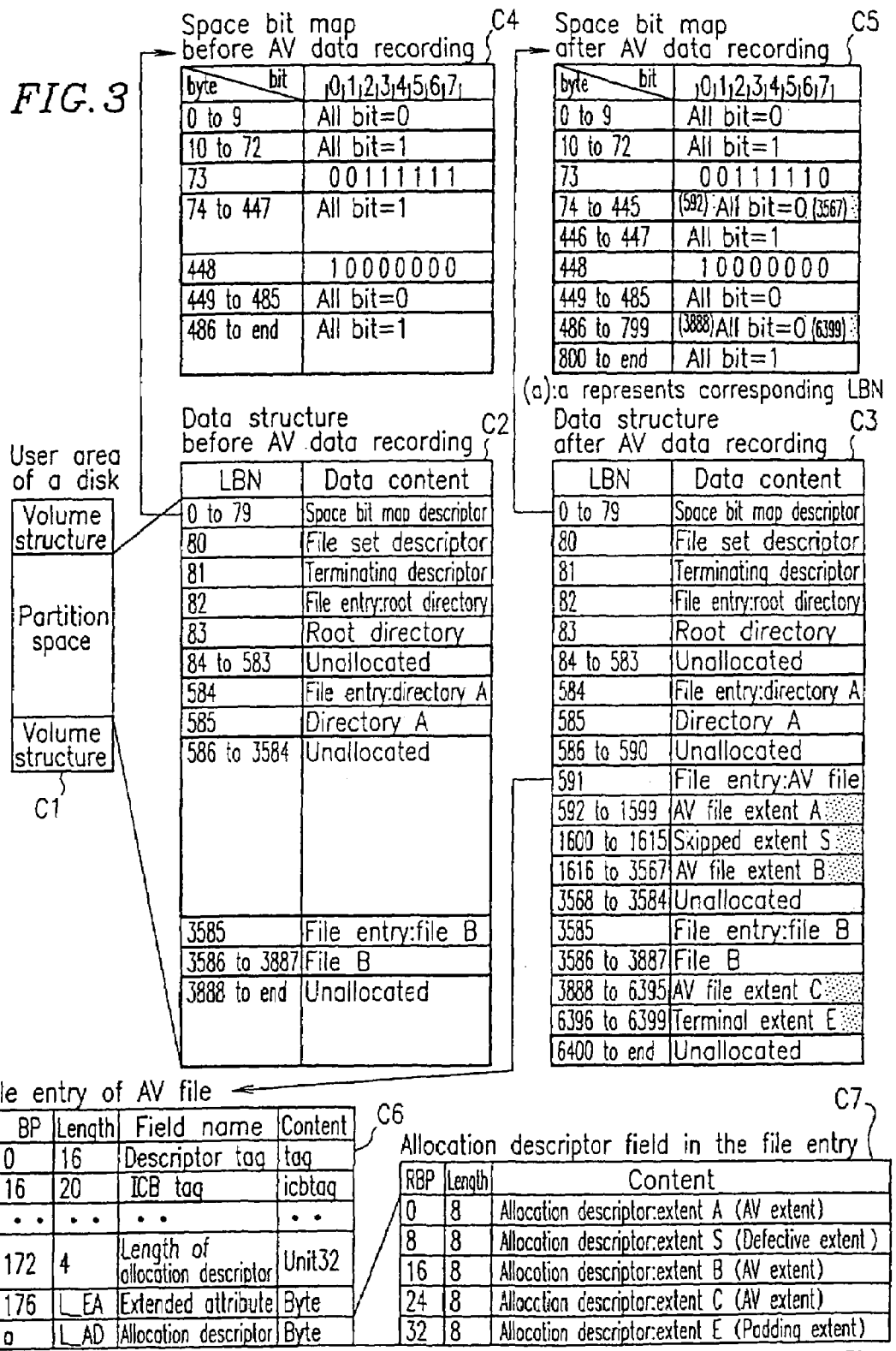
FIG. 3 is a diagram illustrating a data structure of a file and file management information.

C2 in FIG. 3 illustrates a data structure of the partition space, in which the files illustrated in FIG. 8 are recorded.

Space bit map descriptors are recorded in LBNs 0 to 79. The space bit map descriptors each have a space bit map indicating whether each sector is allocatable or not. When the operation ip(x) represents the integral portion of x, while the operation rem(a,b) represents a−b×ip(a/b), the sector allocation information of a sector at LBN s is registered at bit rem(s,8) in byte ip(s/8) in the space bit map. When the bit value is 1, the sector is unallocated, while 0 means allocated. In the example of C4, the bits corresponding to the unallocated sectors at LBNs 84 to 583, 586 to 3584 and 3888 to the end are set to 1.

A file set descriptor is recorded at LBN 80. In the case of a file entry of the root directory, the location information is recorded in the file set descriptor.

A terminating descriptor is recorded at LBN 81. The terminating descriptor indicates the end of the file set descriptor.

A file entry is recorded at LBN 82.

Since the ISO 13346 standard accommodates a rewritable disk, as well as a read only disk, the recording location of the file is stored and managed in information called a file entry.

In a file entry, various attribute information particular to the file and the recording location of the file are recorded. In a directory, the file names of the files included in the directory and the location information of the file entries are recorded.

A file entry indicates the recording address of a file existing in the partition space by an allocation descriptor field. C6 illustrates the structure of the file entry.

A descriptor tag is provided for identifying a descriptor such as a space bit map descriptor. In the case of a file entry, 261 is described as the descriptor tag, indicating a file entry.

An ICB tag is for indicating the attribute information relating to the file entry itself.

FIG. 25 is a diagram illustrating the structure of an ICB tag, while FIG. 26 is a diagram illustrating the structure of flag fields of the ICB tag. In FIG. 25, there is a flag field of 2 bytes at RBP 18 in the ICB tag. In FIG. 26, a flag indicating whether the file is an AV file or not is assigned to the ninth bit in the flag field. When an AV file is identified from this flag, AV data is recorded in the group of sectors forming the file.

Extended attributes are for describing attribute information of a more advanced level than the level defined by the attribute information field in the file entry.

The allocation descriptor is for managing an area including continuous sectors as one extent. As illustrated in FIG. 10, the allocation descriptor has the extent length and the location information thereof. FIG. 11A illustrates the interpretation of the upper two bits of the extent length included in the allocation descriptor of a non-AV file. It is thus possible to indicate whether the extent has been allocated or not and whether it has been recorded or not. FIG. 11B illustrates the interpretation of the upper two bits of the extent length included in the allocation descriptor of an AV file. It is thus possible to indicate whether the extent is an AV extent, a defective extent or a padding extent.

Hereinafter, as supplementary description, an operation of the disk reproduction drive apparatus for acquiring a sector address storing a desired file will be described.

Figure 22:
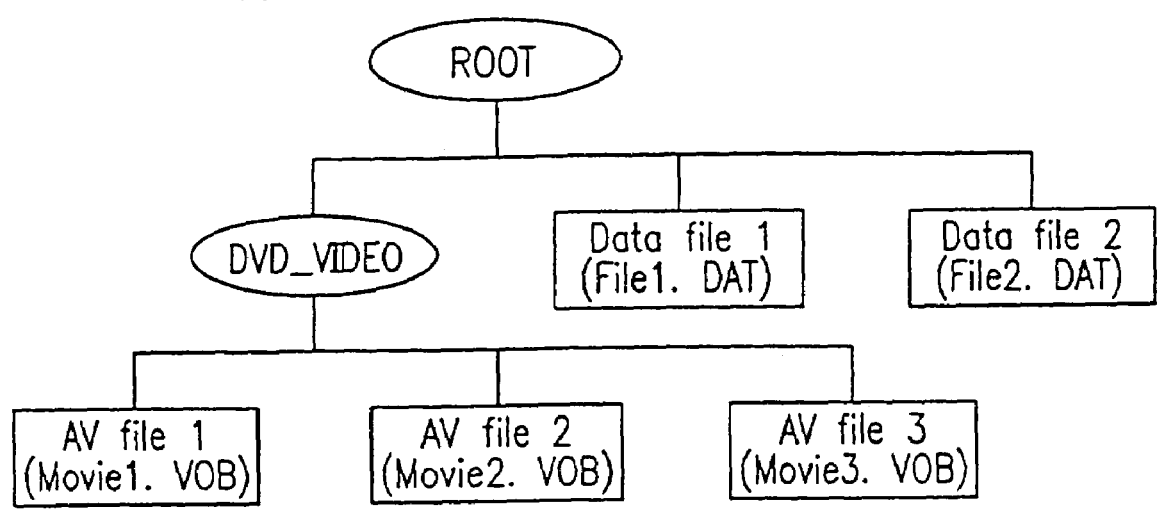
FIG. 22 is a diagram illustrating an example of a file/directory structure.

FIG. 22 illustrates an example of a file/directory structure. An ellipse represents a directory while a rectangle represents a file. In this example, a directory, DVD_VIDEO, and two files, File1.DAT and File2.DAT, exist under the Root directory. The directory DVD_VIDEO further includes a total of three files, Movie1.VOB, Movie2.VOB and Movie3.VOB.

FIG. 23 illustrates logical relationship of data in the file management information based on the ISO 13346 standard.

Since the ISO 13346 standard accommodates a rewritable disk, as well as a read only disk, the recording location of the file is stored and managed in information called a file entry.

For example, the recording location of the file entry for the AV file Movie1.VOB is stored as a file identifier descriptor in the DVD_VIDEO directory file. The recording location of the file entry for the DVD_VIDEO directory file is stored as a file identifier descriptor in the ROOT directory file. Moreover, the recording location of the file entry for the ROOT directory file is stored in a file set descriptor. Furthermore, the file set descriptor is recorded in a predetermined location as a part of the file management information. With such a structure, the recording location of the target file can be acquired by first referring to the file set descriptor and then following the file entries starting from the ROOT directory according to the directory hierarchical structure. A directory file has a plurality of file identifier descriptors, and each file identifier descriptor includes the recording address and the file name of the file entry of the file or directory managed by the directory.

(1-3) Defective Sector Management Method 1: for Computer Data

When recording computer data on the above-described DVD-RAM, the linear replacement algorithm is employed as a defect management method. In the linear replacement algorithm, the computer data is first recorded in the user area. When a defective sector is detected during the recording operation by detecting an address error, a verify error, or the like, an ECC block including the defective sector is recorded in a spare area illustrated in FIG. 4C, while the location information of the replaced ECC block is recorded as defect management information in the defect management area (DMA) provided in the lead-in area and in the lead-out area.

Figure 24:
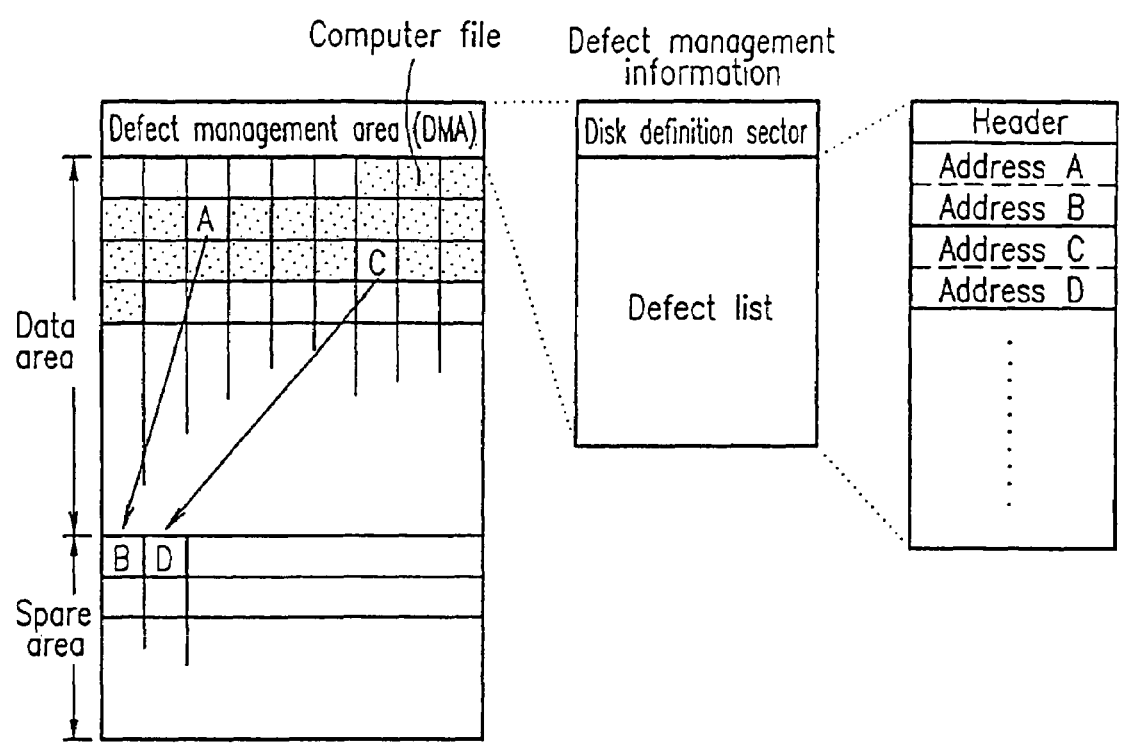
FIG. 24 is a diagram illustrating a data structure for defect management used for recording a computer file.

FIG. 24 illustrates the data structure of the defect management area. As illustrated in FIG. 24, the defect management area includes a disk definition sector and a defect list. The disk definition sector stores the location information of the defect list. The defect list includes a defect entry having pairs of leading addresses (address A and address C) of ECC blocks, which each include a defective sector, and leading addresses (address B and address D) of other ECC blocks respectively replacing the ECC blocks. Such a defective sector is detected when formatting the disk, when recording data to the disk, or the like. The example illustrated in FIG. 24 shows that the ECC block starting from address A in the data area is replaced by the ECC block starting from address B, while the ECC block starting from address C is replaced by the ECC block starting from address D. Thus, in the linear replacement algorithm, defective sectors are managed in an integrated manner by the defect management information recorded in the defect management area.

(1-4) Defective Sector Management Method 2: for AV Data

Hereinafter, the outline of the defect management method will be described, which is a feature of the present invention and used when recording AV data on the above-described DVD-RAM. Herein, AV data refers to, for example, data including a sound or a video compressed by MPEG. For example, when a defective sector, for which address cannot be reproduced, is detected during an AV data recording operation, the ECC block including the defective sector is skipped, and the data is recorded from the beginning of the following ECC block. The recording location of the ECC block including the defective sector is registered in the file entry as one allocation descriptor. Moreover, when a large number of defective sectors are detected in the AV file recording operation, the location information of the defective sectors is registered in the file entry for the AV file using separate allocation descriptors. Thus, such a defect management method is different from the conventional linear replacement method in that the location information of the replaced ECC block is never recorded in the defect management area provided in the lead-in area or in the lead-out area.

Moreover, in an AV file reproduction operation, since the AV data is reproduced while skipping defective sectors with reference to the allocation descriptors in the file entry, the disk reproduction drive is able to reproduce AV data while skipping the defective sectors without managing the addresses of the defective sectors.

(2) Data Recording Method

Figure 1:
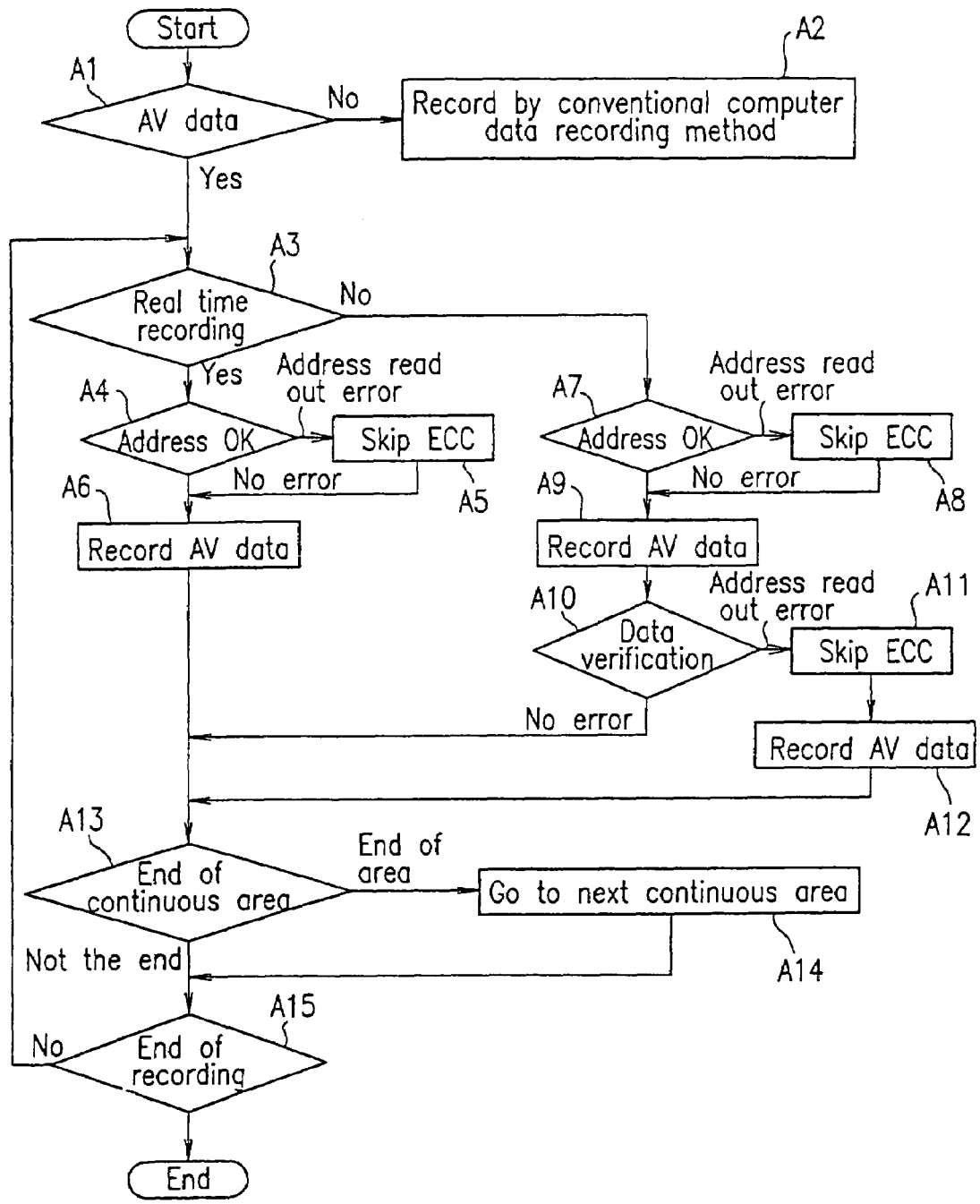
FIG. 1 is a flow chart illustrating a recording operation for AV data according to the present invention.

Hereinafter, a method for recording AV data to the above-described DVD-RAM will be described. FIG. 1 is a flow chart illustrating a recording operation for AV data according to the present invention.

First, it is determined whether the input data is AV data or not (step A1). This determination is based on the type of command sent from the host, the mode in which data is transferred from the host, or the like. For example, when Write_AV command is sent for recording AV data, it is determined to be AV data, while it is determined to be normal computer data when normal Write command is sent.

When recording file management information and computer data including code data, they are recorded based on the conventional linear replacement algorithm while verifying the defective sectors (step A2).

In the case of AV data, it is further determined (step A3) whether the data is the AV data which requires real time recording, such as those sent from a digital video movie, digital broadcasting, or the like, or the AV data which can be asynchronously recorded while preferentially ensuring the reliability thereof, such as data downloaded from the internet. For example, when the synchronous mode is set as the data transfer mode from the host computer to the recording apparatus, it is determined to be real time recording, while it is determined to be non-real time recording when the asynchronous mode is set. Alternatively, it can be determined to be real time recording when the data is transferred from a digital video movie, or the like, based on the type of equipment connected to the recording apparatus, while it can be determined to be non-real time recording when the data is transferred from network equipment such as those used for the internet.

In the recording operation for AV data which requires real time recording, when an address error is detected from the target sector, the ECC block including the sector is skipped, and the data is recorded from the leading sector in the following ECC block (steps A4 to A6). By recording data while skipping ECC blocks including defective sectors as described above, it is possible to continue the data recording operation without performing any seek operation even if a defective sector is detected, unlike the replacement recording for computer data as illustrated in FIG. 4C.

In the recording operation for AV data for which the asynchronous recording is applied while preferentially ensuring the reliability thereof, when a defective sector having an address error is detected during the data recording, the ECC block including the defective sector is skipped, and the data is recorded from the leading sector in the following ECC block (steps A7 to A9), as described above. Then, the recorded data is read out and verified. If a defective sector including a data error is detected, the recorded data is recorded in the following ECC block (steps A10 to A12). By performing such a data recording operation, a defective sector is reliably detected, while it can be recorded in the following ECC block, rather than in a spare area, whereby a video or a sound can be reproduced uninterruptedly. When completing the data recording for a continuous area which is previously specified by a command, or the like, data recording is resumed for the next continuous area (steps A13 to A14).

For simply illustrating the data recording operation for the DVD-RAM disk in which an ECC block is composed of a plurality of sectors, it is assumed in the above description that the entire ECC block including a defective sector is skipped. However, it is apparent that it is possible to similarly perform a data recording method in which only the defective sector, rather than the entire ECC block, is skipped. Moreover, the defective sector is skipped by sectors also in the case where the ECC block has the same size as the sector size.

C3 in FIG. 3 illustrates the data structure of the disk, on which an AV file is recorded by the above-described recording method. Hereinafter, the data structure will be described referring to FIG. 9, which describes C2 and C3 of FIG. 3 in detail. A first continuous area at LBNs 592 to 3567 and a second continuous area at LBN 3888 to the end, both unallocated, are previously specified as recording areas for the AV file so that the recording is made from the beginning of the ECC block. When recording AV data which requires real time recording, the AV data recording is first performed from the leading sector in the first continuous area. Then, an address error is detected from the sector at LBN 1600, whereby the ECC block (16 sectors) including this defective sector is skipped, and the AV data is recorded in the following ECC block is performed, starting at LBN 1616. Following the completion of the data recording operation for the first continuous area, a data recording operation for the second continuous area, which starts at LBN 3888, is performed. When recording AV data for which the asynchronous recording is applied while preferentially ensuring the reliability thereof, if a data error is detected from the sector at LBN 1600, the ECC block including the defective sector is skipped and the AV data is recorded in the following ECC block, as described above. Thus, the real time recording and the asynchronous recording both employ the same data structure since AV data is recorded while skipping an ECC block including a defective sector in both cases. Therefore, when reproducing AV data, defective extent S is skipped while only AV extents A, B and C are read out in the same manner. Even when unallocated areas exist discretely on the disk, uninterrupted reproduction of a video or a sound is ensured during the AV data reproduction, as long as an amount of data more than a predetermined amount can be recorded in each of the unallocated areas while the distance between the unallocated areas is in a range which allows for the areas to be accessed within a predetermined amount of time. This is because the AV data read out from the disk by the disk reproduction apparatus is reproduced after it is temporarily stored in a track buffer, or the like. In other words, since AV data stored in the buffer is reproduced during an access operation between continuous areas, the continuous reproduction of a video or a sound is maintained even if data reproduction from the disk is temporarily discontinued.

Figure 2:
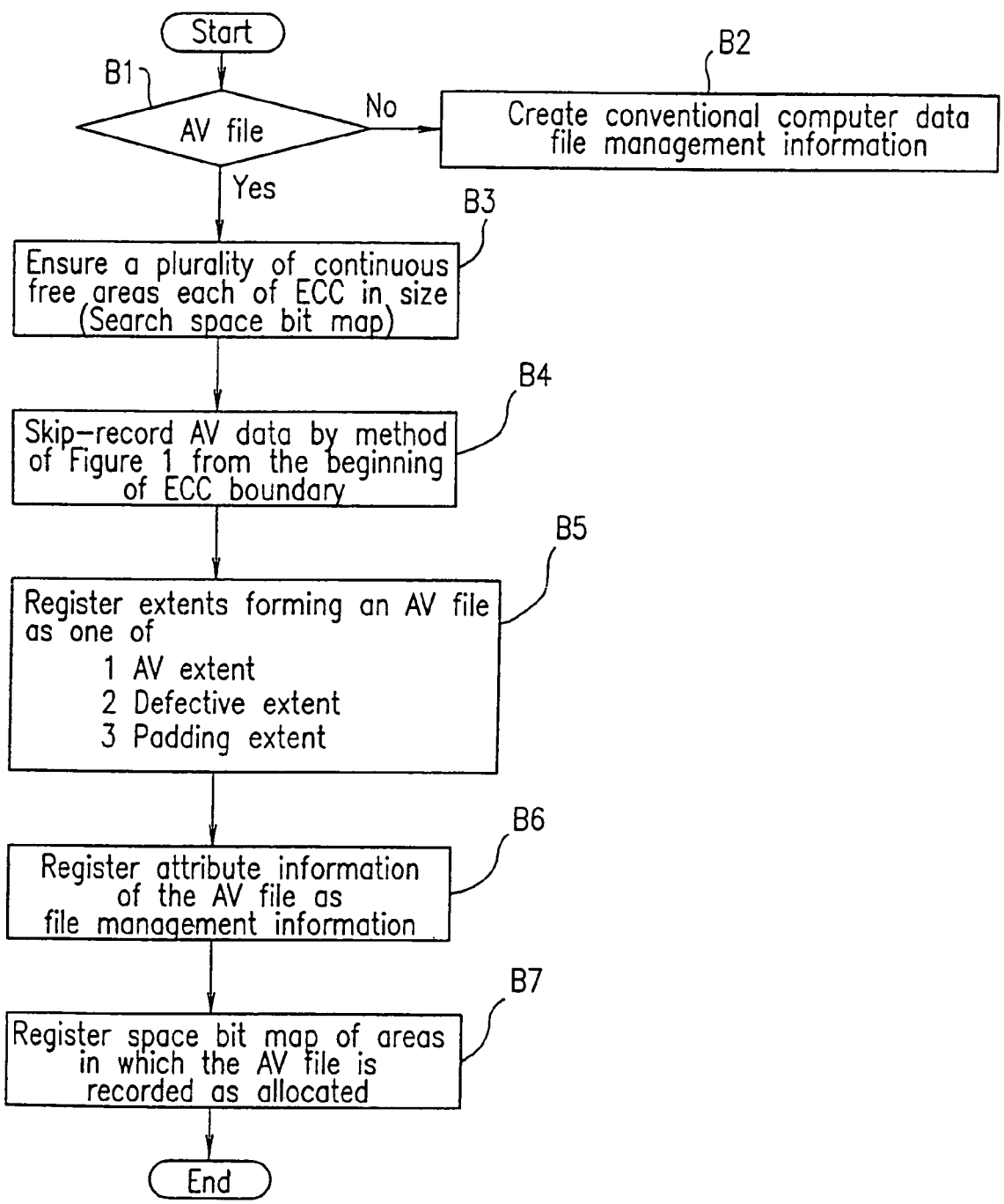
FIG. 2 is a flow chart illustrating a recording operation for an AV file including creation of file management information.

Next, referring to FIG. 2, a method for creating and registering file management information for AV file according to the present invention will be described.

First, it is determined whether the file to be recorded is an AV file or not. This determination is based on, for example, the file name extension or the file's attribute provided by an application program, a user, or the like (step B1). In the case of file management information such as a directory file or a data file for computers, a file recording operation and a file management information registration are performed based on the conventional file system of ISO 13346 (step B2). When the file to be recorded is an AV file, a continuous free area of 5 MB or larger is searched for by ECC blocks based on the contents of the space bit map (step B3). For example, in C4 of FIG. 3, the continuous area at LBNs 592 to 3567 and the continuous area at LBN 3888 to the end are searched for as the continuous free area. Then, based on the recording method described above with reference to FIG. 1, AV data is recorded to the searched free area while skipping defective sectors (step B4). In order to manage the location information where AV data is recorded, the location information of an area in which only AV data is recorded is registered as an AV extent, the location information of a skipped ECC block is registered as a defective extent, and the location information of an area in the terminal portion of the file where padding data for completing the ECC block is recorded is registered as a padding extent, respectively in the file management information (step B5). In C3 of FIG. 3, extents A, B and C are each an area where AV data is recorded, extent S is an area which has been skipped because of a defective sector detected therein, and extent E is an area in the terminal portion of the file where padding data is recorded. The respective extents are registered, as illustrated in C7, as separate allocation descriptors in the file entry (C6) of the AV file. Then, attribute information is registered in the file entry, in which an AV attribute bit is set indicating that the recorded file is an AV file (step B6). In C6 of FIG. 3, the AV attribute bit is set as a contiguous bit defined in the ICB tag. Finally, in order to set the area where the AV file is recorded as allocated, bits corresponding to extents A, S, B, C and E in the space bit map are set to 0 indicating allocated (step B7). For example, in C5 of FIG. 3, bits from bit 7 in byte 73 to bit 7 in byte 445 and bits from bit 0 in byte 486 to bit 7 in byte 799 are set to 0. By providing such a data structure, it is determined whether the reproduced file is an AV file or not from the file attribute information shown in FIG. 26. Then, if the file is an AV file, the reproduction operation can be performed only using the location information of the AV extent registered in the file entry while neglecting the defect management information recorded in the defect management area. In the data reproduction operation, extent S and extent E are not used since no AV data is recorded therein.

Figure 12:
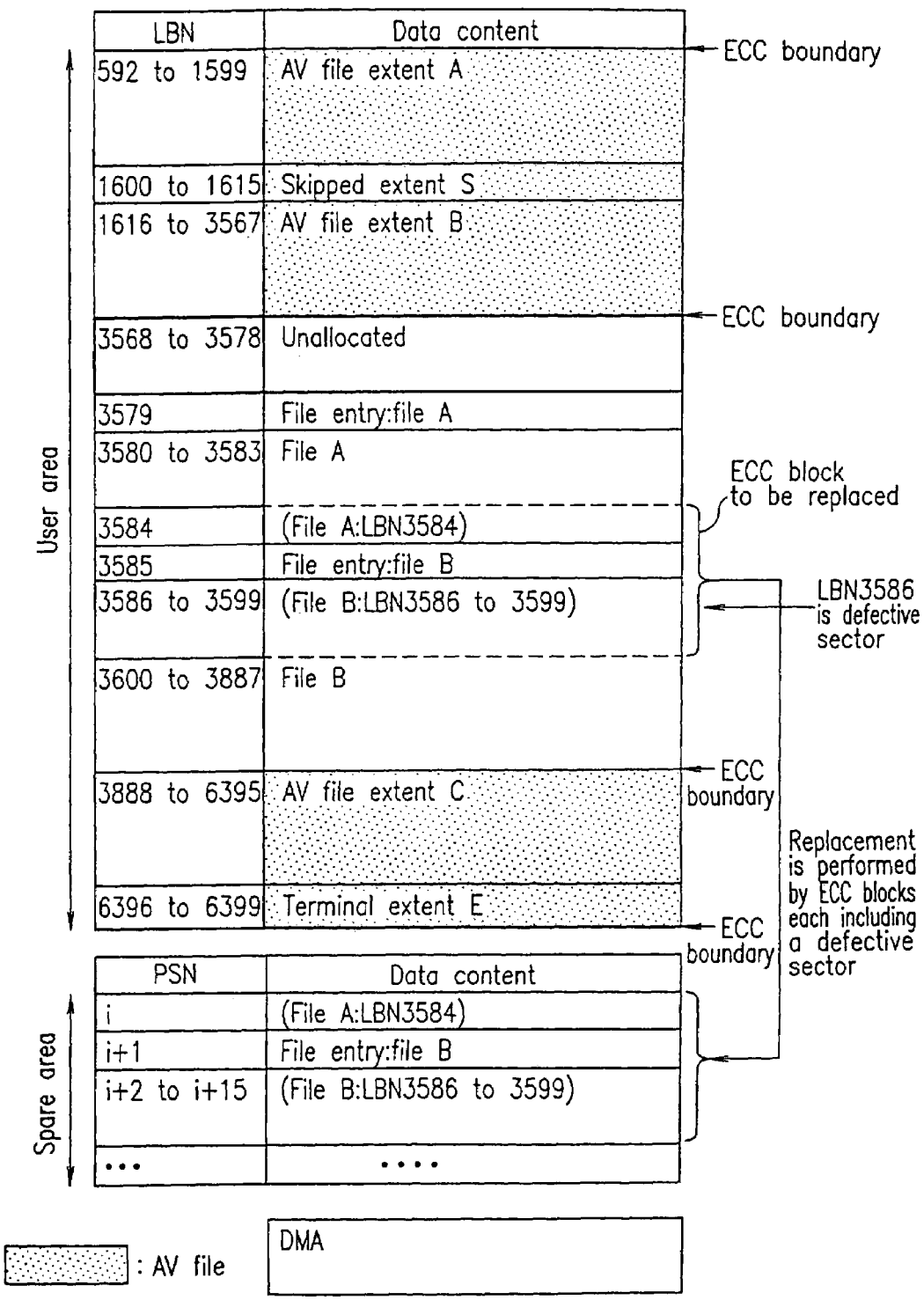
FIG. 12 is a diagram illustrating a recording state of a disk on which an AV file and a computer file are mixedly recorded.

Hereinafter, referring to FIG. 12, the data structure of a disk in which a computer file and an AV file are mixedly recorded will be described. If the sector at LBN 3586 which is assigned for recording file B, a computer file, is a defective sector, the ECC block (LBNs 3584 to 3599) including the defective sector is recorded in a spare area, and the defect management information is recorded in the defect management area. Herein, since the replacement recording is performed by ECC blocks, the file entry of file B and a portion of file A are simultaneously recorded in the spare area. If file A is an AV file, and a portion of the AV data included in the AV file is recorded in the same ECC block where a computer file is recorded, then, the AV data will also be recorded in the spare area. In order that AV data and computer data are not mixedly recorded in an ECC block, an AV file is allocated to align with an ECC block boundary, as illustrated in FIG. 12. Thus, each AV file starts from the leading sector in an ECC block, and defective sectors are skipped by ECC blocks, while a padding extent filled with padding data is allocated to each sector where AV data is not recorded so that the AV file allocation is made up to the end of the ECC block. By providing such a data structure, a continuous reproduction operation for AV data is ensured without accessing any spare area.

Hereinafter, referring to FIG. 13, an example of a method for managing free areas in AV file recording will be described. As described above with reference to FIG. 9, a free area for recording an AV file is first searched for. Then, the first continuous area at LBNs 592 to 3567 and the second continuous area at LBN 3888 to the end are assigned as the free area. Subsequently, an AV reserved file is created by recording a file entry in which these free areas are managed as allocated and unrecorded extents. At the same time, the area in which the file entry is recorded and the two allocated continuous areas are registered in the space bit map as allocated. An AV file is recorded, by the method described above with reference to FIG. 1, from the beginning of the allocated extent which has been previously registered in the AV reserved file. When these free areas are allocated as areas for recording the AV reserved file, in advance of the AV data recording, even if a recording operation for an AV file and a recording operation for a computer file are performed in parallel in a multi-task environment, the computer file is assigned to a remaining unallocated area, whereby it is possible to prevent the AV data and data of a computer file from being erroneously assigned in the same ECC block.

(3) Data Reproduction Method

Hereinafter, a method for reproducing an AV file according to the present invention will be described, along with a reproduction operation for file management information.

Figure 14:
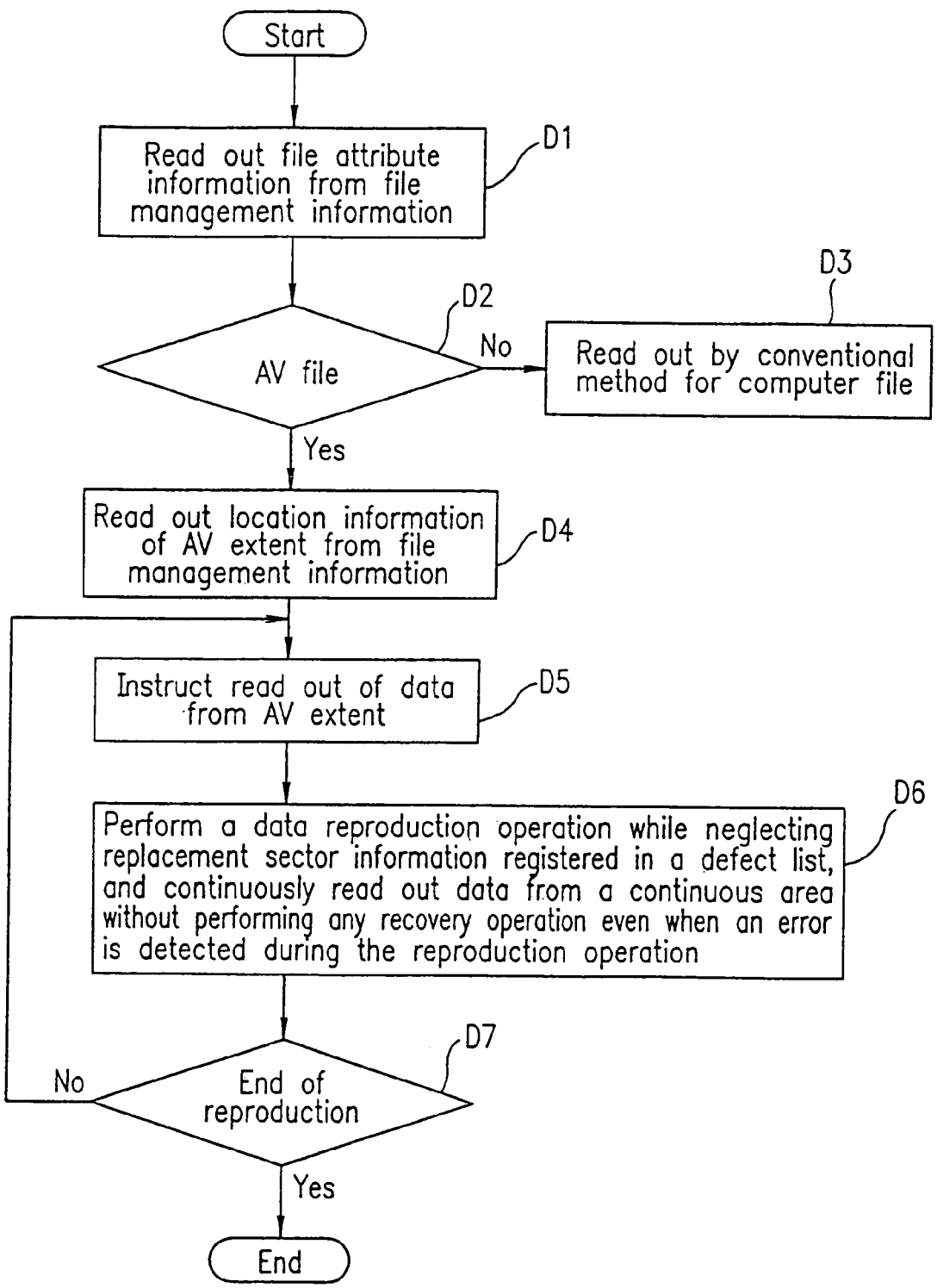
FIG. 14 is a flow chart illustrating a method for reproducing an AV file.

FIG. 14 is a flow chart illustrating a method for reproducing an AV file. First, the AV attribute bit is read out from the file entry of a file to be reproduced (step D1). The AV attribute bit is included in the ICB tag, as illustrated in C6 of FIG. 3. As described above, the AV attribute bit is a contiguous bit described in FIG. 26 and is attribute information for determining whether an AV file or not. This bit being 1 indicates an AV file, while this bit being 0 indicates a non-AV file such as a computer file. Based on the value of the AV attribute bit, it is determined whether the file is an AV file or not (step D2). Then, if the file is a computer file, it is read out by the conventional method for computer files (step D3). On the other hand, in the case of an AV file, an allocation descriptor field registered in the file entry of the AV file is read out, and the location information of the respective AV extents included in the AV file is sequentially read out (step D4). Moreover, the reproduction apparatus is instructed to read out AV data from each AV extent (step D5). Herein, the reproduction apparatus continuously reads out only AV data from the AV extents while neglecting the replacement sector information registered in the defect list on the disk and while performing no recovery operation even when an address error or a data error is detected during a reproduction operation (step D6). Finally, it is determined whether the AV data has been reproduced from all the AV extents included in the AV file (step D7). Then, if there is an unreproduced AV extent, steps D5 and D6 are repeated again. By performing such a reproduction operation, the AV file which has been recorded by the method of FIG. 1 is continuously reproduced while the video or the sound is not interrupted.

Although the recording/reproduction operations of the present invention have been described with a DVD-RAM disk, it is apparent that similar recording/reproduction operations can be performed with, for example, a magnetic disk or a magneto-optical disk, as long as it is a recording medium with a large capacity on which an AV file can be recorded.

For simply illustrating the data recording operation for the DVD-RAM disk in which an ECC block is composed of a plurality of sectors, it is assumed in the above description that the entire ECC block including a defective sector is skipped. However, it is apparent that it is possible to similarly perform a data reproduction method in which only the defective sector, rather than the entire ECC block, is skipped. Moreover, the defective sector is skipped by sectors also in the case where the ECC block has the same size as the sector size.

Although the present invention has been described while assuming that the AV extent, the defective extent and the padding extent are each identified using a portion of an allocation descriptor described in FIG. 11B, it is apparent that the extent attribute identification is not limited to such attribute information, but can be assigned to another descriptor, another bit, or the like. For example, it is also possible to define a data structure of a new allocation descriptor and to provide a field indicating the extent attribute information.

The padding extent is not limited to those provided in the terminal portion of a file. For example, when the size of the AV extent is reduced while editing an AV file, the area in the AV extent in which AV data is no longer recorded may be registered as a new padding extent. In such a case, the padding extent is allocated in a leading portion or an intermediate portion of the file.

In the above description of the present invention, an area including a defective sector detected during a recording operation for an AV file is registered as a defective extent. Other than such a method, it is possible, for example, to define a special file for managing a defective extent and the file attribute information thereof so as to assign and manage a file which is composed only of defective extents.

Although a space bit map has been used as information for managing unallocated areas on the disk in the above description, they can also be managed by using a space table.

Although the present invention has been described while assuming the size of a continuous free area allocated for recording an AV file to be 5 MB or larger, it is obvious that the size may differ depending upon the buffer capacity, the access performance, or the like, of the reproduction apparatus.

Although an AV reserved file is registered for allocating a continuous free area for recording an AV file in the above description of the present invention, it is also possible to previously allocate a continuous free area using a new bit map, a table, or the like.

When reproducing AV data from AV extents by the reproduction method of the present invention, it is obvious that continuous data reproduction can be more reliably performed if the reproduction apparatus reads ahead the AV data while storing the AV data in cache during reproduction.

(Embodiment 2)

Hereinafter, an information processing system including a recording/reproduction apparatus for recording/reproducing data to/from the above-described DVD-RAM disk and a control device for controlling the same will be described as Embodiment 2 of the present invention.

Figure 15:
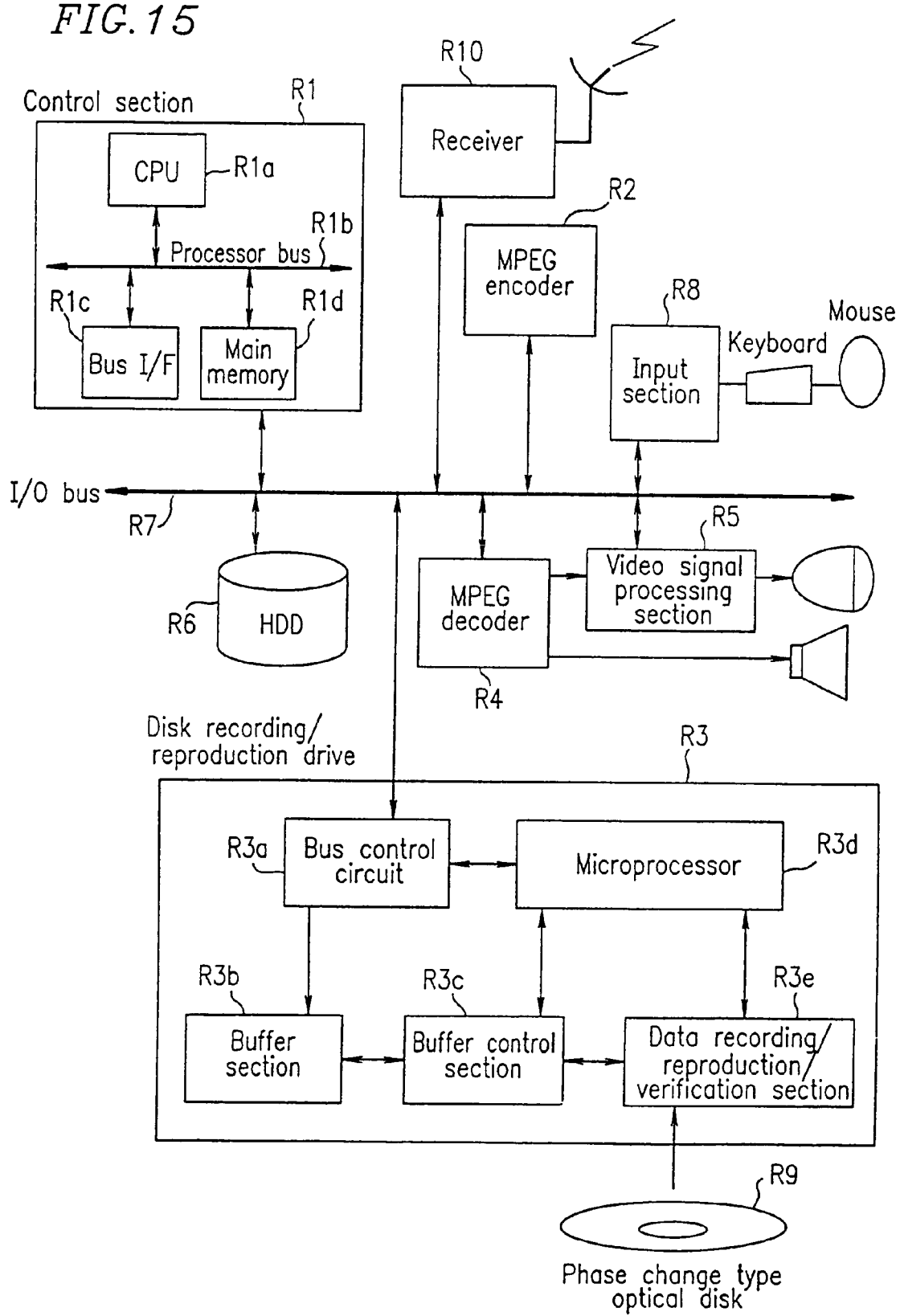
FIG. 15 is a block diagram illustrating a structure of an information processing system of the present invention.

FIG. 15 is a block diagram illustrating a structure of the information processing system of the present invention.

R1 denotes a control section; R2 denotes an MPEG encoder; R3 denotes a disk recording/reproduction drive; R4 denotes an MPEG decoder; R5 denotes a video signal processing section; R6 denotes a hard disk drive; R7 denotes an I/O bus; R8 denotes an input section; R9 denotes a rewritable phase change type optical disk; and R10 denotes a receiver.

Figure 20A:
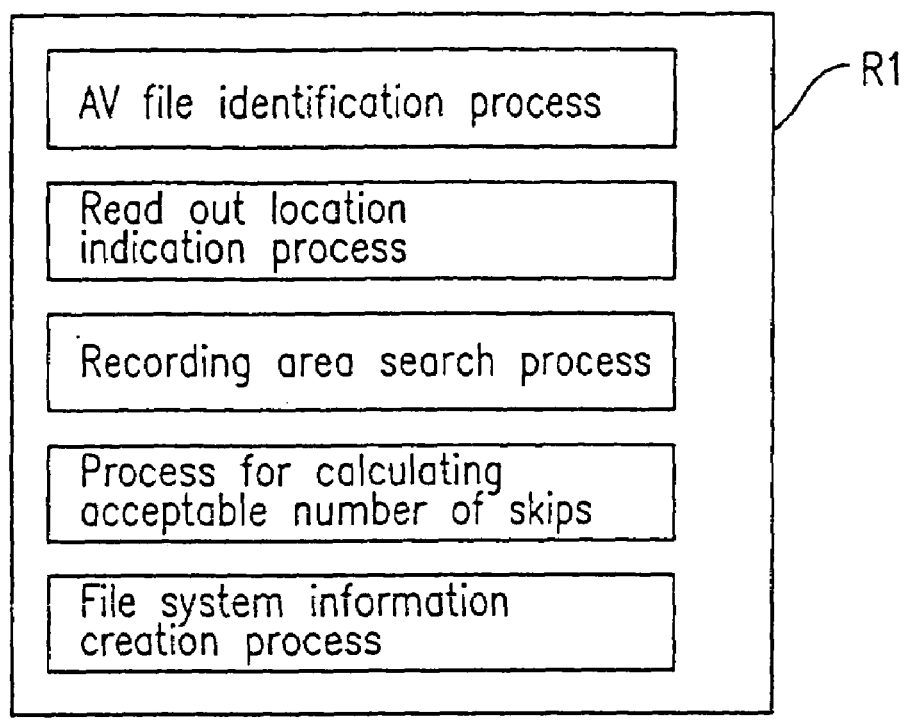
FIGS. 20A and 20B are diagrams illustrating processes performed by a control section and a microprocessor, respectively, in real time recording of AV data.

The control section R1 includes a CPU R1a, a main memory R1d, a bus interface R1c and a processor bus R1b. Based on a program stored in the main memory R1d, the control section R1 performs an AV file identification process, a read out location indication process, a recording area searching process, a process for calculating the acceptable number of skips and a file system information creation process, as illustrated in FIG. 20A.

Figure 20B:
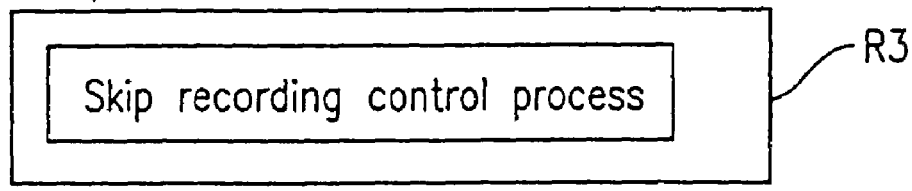

The disk recording/reproduction drive R3 includes: a microprocessor R3d for controlling the entire drive; a bus control circuit R3a for controlling transmission/reception of a command or data to/from the control section R1 via an IDE (Intelligent Drive Electronics) bus; a data recording/reproduction/verification section R3e for performing data reproduction including data recording and data verification operations to the phase change type optical disk R9; a buffer section R3b for temporarily storing recording data, reproduction data, and data read out for data verification; and a buffer control section R3c for controlling data transfer of the buffer section. The microprocessor R3d performs a skip recording control operation, as illustrated in FIG. 20B.

The phase change type optical disk R9 is the DVD-RAM disk as described above in Embodiment 1.

Hereinafter, the operation of recording AV data received by the receiver R10 via a broadcast wave to the phase change type optical disk R9 will be described with reference to FIG. 16. Herein, it is assumed that the file system information recorded on the phase change type optical disk R9 has already been read out and stored in the main memory R1d in the control section.

Figure 16:
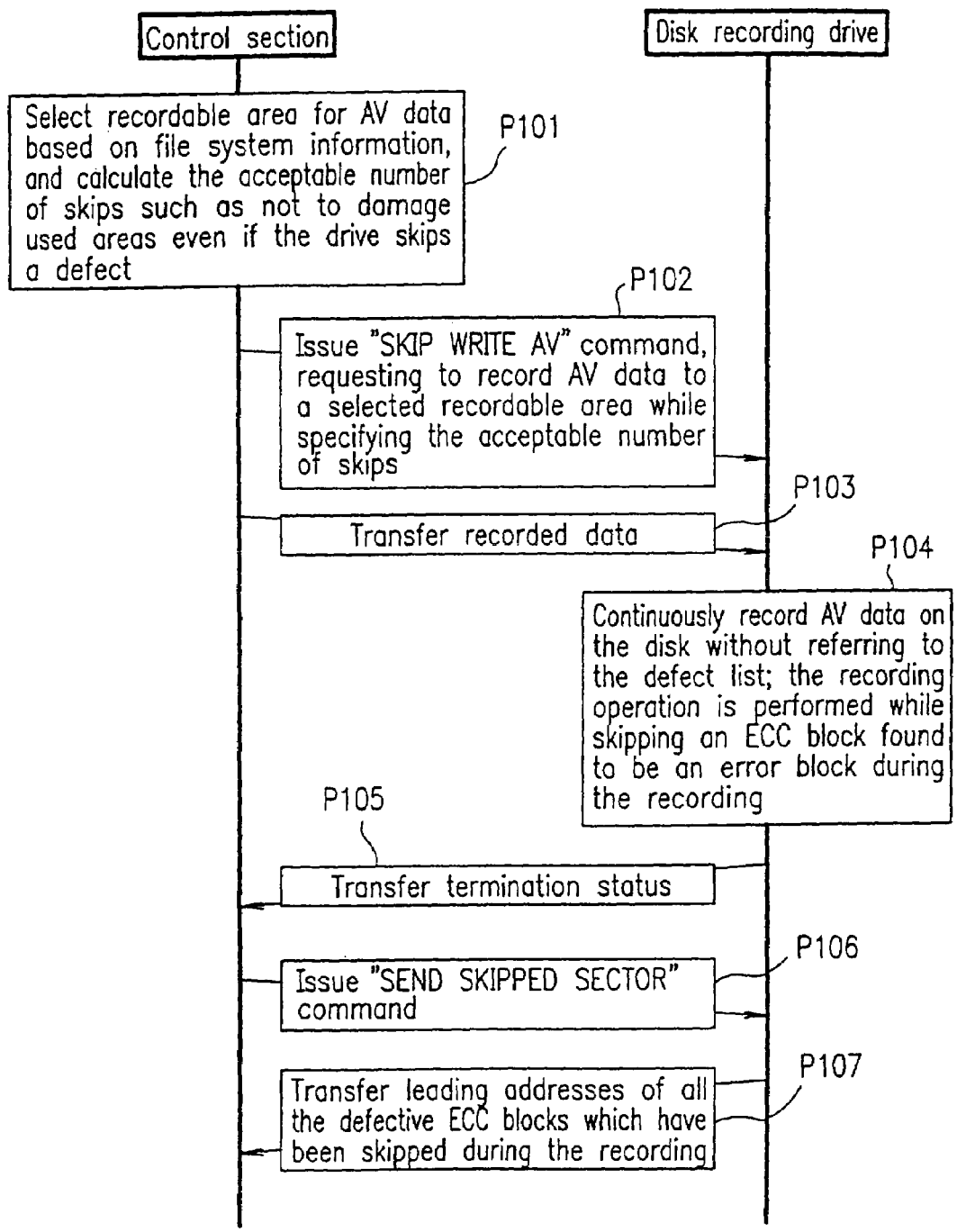
FIG. 16 is a diagram illustrating a protocol used between a control section and a disk recording drive when recording in real time AV data received via a broadcast wave.

FIG. 16 illustrates a protocol used between the control section R1 and the disk recording drive R3 in an operation for recording AV data, which is moving image information received by the receiver R10 via a broadcast wave, to the phase change type optical disk R9.

(P101) The recording area searching process by the control section R1 selects a continuous free area for recording an AV file by referring to the file system information which is previously read out and stored in the main memory R1d when the phase change type optical disk R9 is mounted. In the process for calculating the acceptable number of skips, the number of ECC blocks which can be skipped by the disk recording drive R3 is calculated from the file system information.

(P102 to P103) The control section R1 issues "SKIP WRITE AV (ADR, LEN, SKIP_LEN)" as a command to record AV data while skipping the ECC block including the defective sector detected by the recording drive R3. Herein, the parameter ADR denotes the starting address of data recording; LEN denotes the number of blocks to be recorded; and SKIP_LEN denotes the maximum value for the number of ECC blocks to be skipped (hereinafter, referred to as the "acceptable number of skips"). When receiving the "SKIP WRITE AV", the disk recording drive R3 starts a recording operation for AV data transferred.

(P104) When a defective sector having an address error is detected while the disk recording drive R3 is recording AV data, the ECC block including the defective sector is regarded as a defect ECC block. Then, the starting address of the ECC block is internally stored, and a data recording operation is performed to the following ECC block.

(P105) When the disk recording drive R3 detects a defect ECC block, and the defect ECC block is accordingly skipped, if the preset acceptable number of skips is exceeded, the disk recording drive R3 stops the data recording operation, while reporting an error status to the control section R1 and returning detailed error information (Skip Sector Over) to the control section R1, indicating that the acceptable number of skips is exceeded. On the other hand, when all AV data has been recorded without performing a skip operation, the disk recording drive R3 returns a normal completion status to the control section R1. Moreover, when all AV data has been recorded with skip operations within the specified acceptable number of skips, the disk recording drive R3 returns to the control section R1 detailed error information (Recovered Error), indicating that the recording has been performed with skip operations within the skip sector number, along with the error status.

(P106) When receiving the detailed error information indicating Recovered Error, the control section R1 issues a command "SEND SKIPPED SECTOR", requesting the address information of the skipped ECC blocks.

(P107) Address information of all the defect ECC blocks which have been stored during the recording operation is transferred to the control section R1, when the disk recording drive R3 receives the "SEND SKIPPED SECTOR" command.

Hereinafter, the reproduction operation for an AV file recorded on the phase change type optical disk R9 will be described with reference to FIG. 17.

Figure 17:
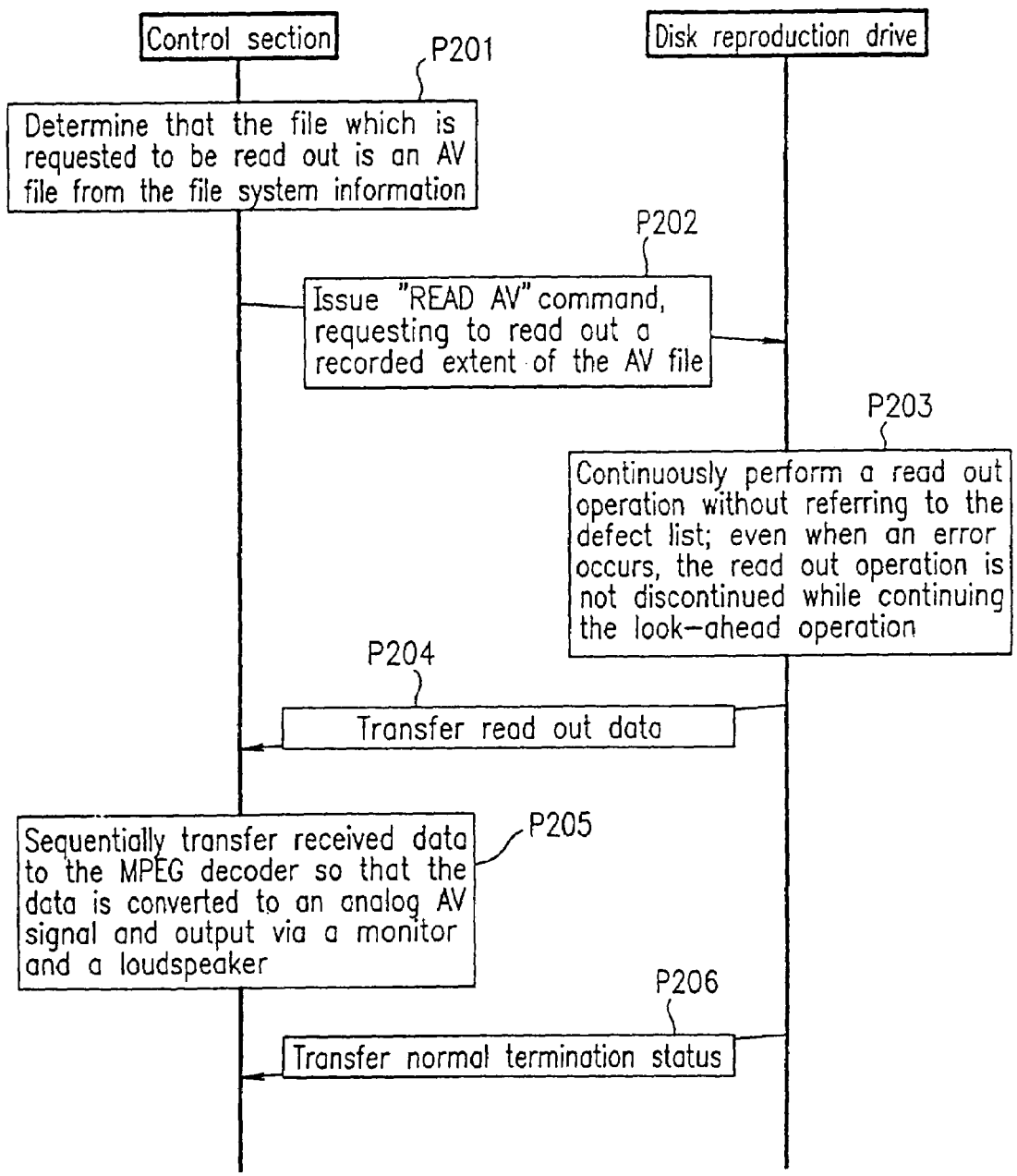
FIG. 17 is a diagram illustrating a protocol used between a control section and a disk reproduction drive in a reproduction operation for AV data recorded on an information recording disk.

FIG. 17 illustrates a protocol used between the control section R1 and the disk reproduction drive R3 in an operation for reproducing the AV data recorded on the phase change type optical disk R9.

(P201) The control section R1 determines, from the file system information, that the file requested to be read out is an AV file.

(P202) The control section R1 issues a "READ AV" command, requesting to read out AV data from AV extents included in the AV file.

(P203 to P204) When receiving the "READ AV" command, the disk reproduction drive R3 continuously performs a data reproduction operation without referring to the defect list, and continues the data reproduction operation even when an address error or a data error occurs. Then, the disk reproduction drive R3 transfers the reproduced data to the control section R1.

(P205) The control section R1 sequentially transfers the read out data to the MPEG decoder R4, thereby outputting an analog AV signal via a monitor display and a loudspeaker.

(P206) The disk reproduction drive R3 transfers a normal completion status to the control section R1.

According to the present embodiment, even if a defective sector is detected during a data recording operation, the data is recorded in the following ECC block while skipping the ECC block including the defective sector, whereby it is possible to record in real time AV data received via a broadcast wave, which requires real time recording. Moreover, in the data reproduction operation, it is not necessary to access the spare area as in the linear replacement algorithm; therefore it is possible to ensure continuous video or sound reproduction.

In the present embodiment, when a different file is recorded following the area allocated for recording an AV file, in order to prevent the area, where the following file is recorded, from being overwritten by AV data, the disk recording drive is allowed to skip ECC blocks within the acceptable number of skips. However, in the case where no valid file is recorded in the following area, it is neither necessary to limit the acceptable number of skips nor to calculate the acceptable number of skips.

Although, in the present embodiment, the number of ECC blocks allowed to be skipped during a recording operation for AV data is set in the disk recording drive R3, the present invention is not limited to such a method. For example, it is apparent that, by previously setting the terminal address of the area where AV data can be recorded, the disk recording drive R3 is able to perform the recording operation while skipping ECC blocks within the area up to the terminal address, thereby obtaining the effect of the present invention.

(Embodiment 3)

Next, an information processing system including a recording/reproduction apparatus for recording/reproducing data to/from the above-described DVD-RAM disk and a control device for controlling the same will be described as Embodiment 3 of the present invention. The difference from Embodiment 2 above is that AV data is input via the internet, rather than a broadcast wave. Accordingly, the real time recording is not performed, but the more reliable asynchronous recording is performed.

Figure 18:
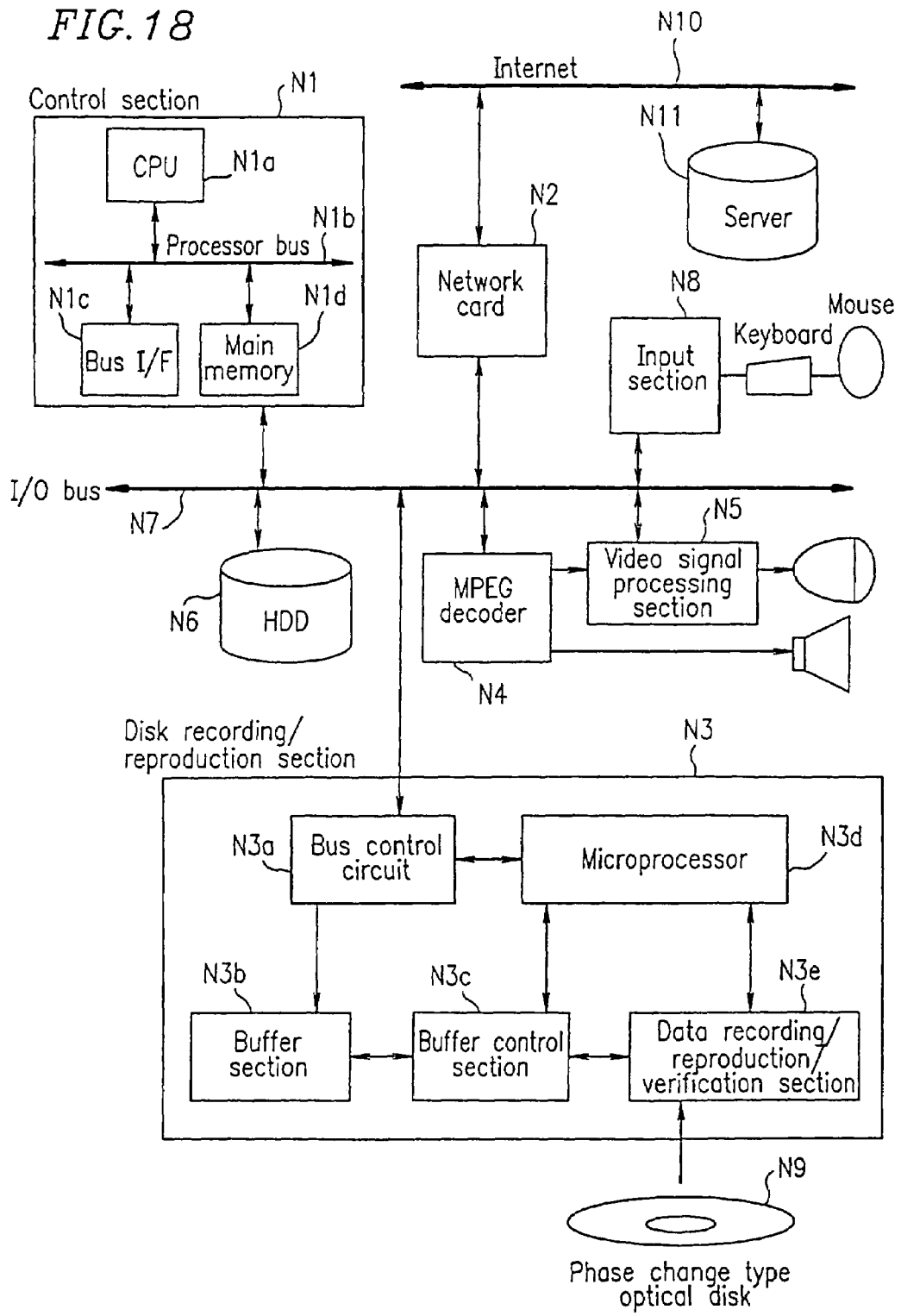
FIG. 18 is a block diagram illustrating another structure of the information processing system of the present invention.

FIG. 18 is a block diagram illustrating a structure of the information processing system of the present invention.

N1 denotes a control section; N2 denotes a network card; N3 denotes a disk recording/reproduction drive; N4 denotes an MPEG decoder; N5 denotes a video signal processing section; N6 denotes a hard disk drive; N7 denotes an I/O bus; N8 denotes an input section; N9 denotes a rewritable phase change type optical disk; N10 denotes the internet; and N11 denotes a server.

Figure 21:
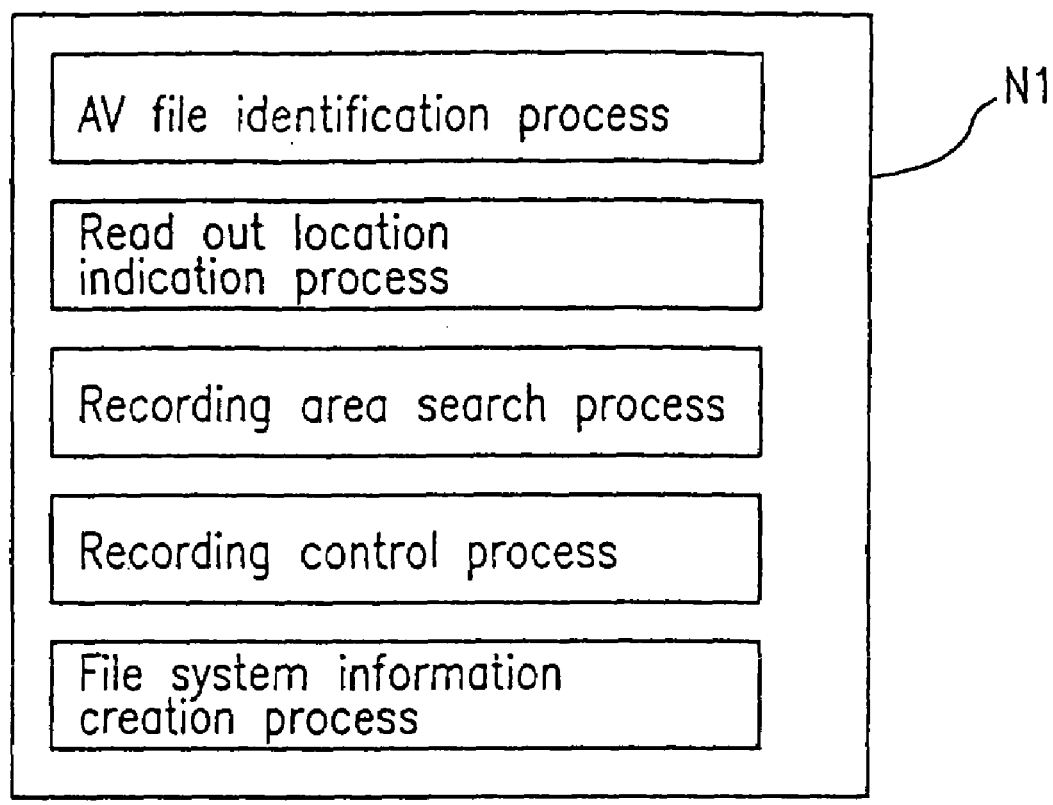
FIG. 21 is a diagram illustrating processes performed by a control section in asynchronous recording of AV data.

The structure of the control section N1 is identical to that of the control section R1 illustrated in FIG. 15. The control section N1 operates based on a program stored in a main memory N1$d$, performing an AV file identification process, a read out location indication process, a recording area searching process, a recording control process and a file system information creation process, as illustrated in FIG. 21.

The structure of the disk recording/reproduction drive N3 is identical to that of the disk recording/reproduction drive R3 illustrated in FIG. 15.

The phase change type optical disk N9 is the DVD-RAM disk as described above in Embodiment 1.

Hereinafter, an operation of recording, to the phase change type optical disk N9 via the network card N2, AV data transferred from the server N11 via the internet N10 will be described with reference to FIG. 18. Herein, it is assumed that the file system information on the phase change type optical disk N9 has already been read out and stored in the main memory N1$d$ in the control section N1. The network card N2 is connected to the internet N10, thus receiving data sent from the server N11.

Figure 19:
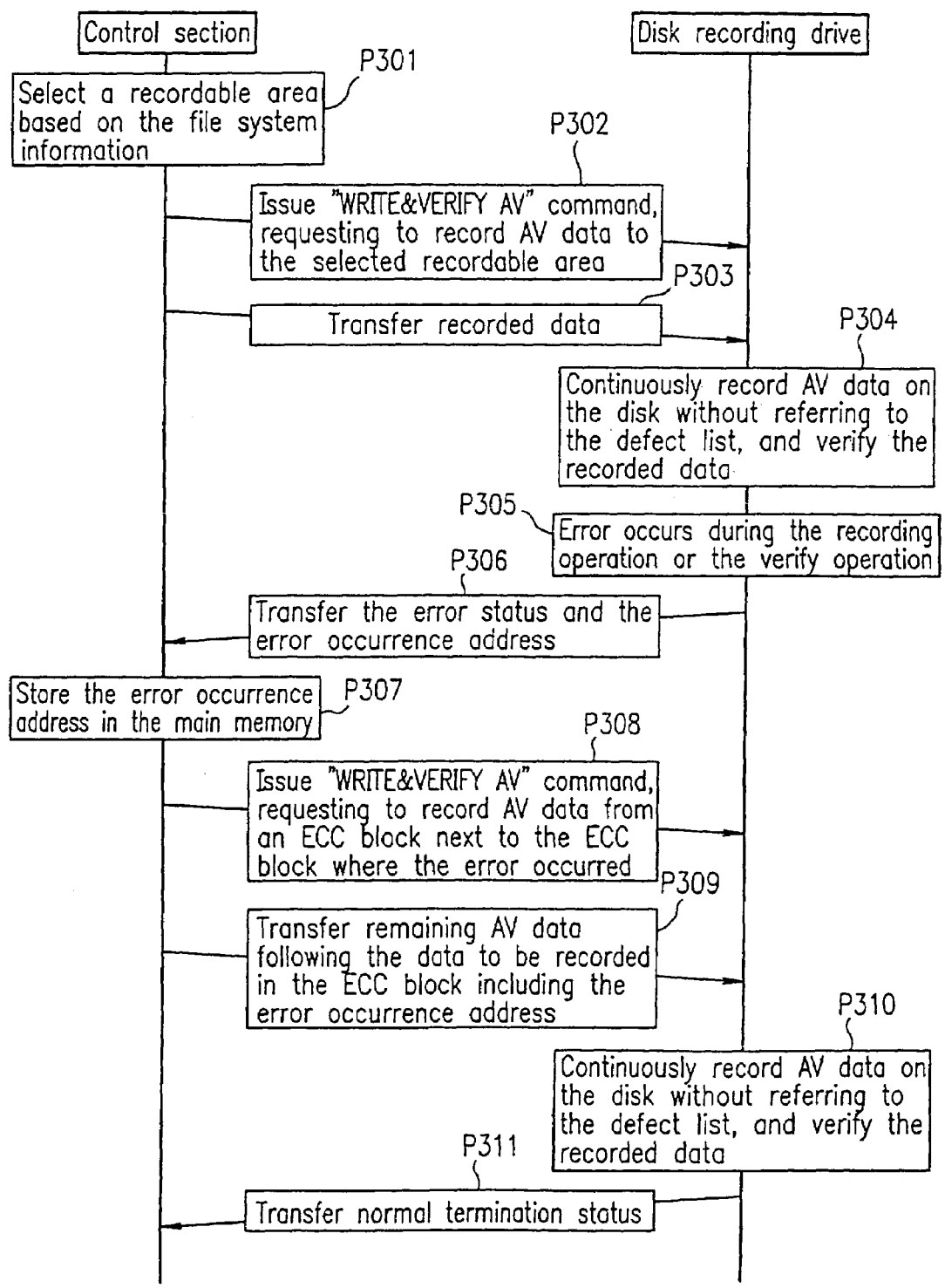
FIG. 19 is a diagram illustrating a protocol used between a control section and a disk recording drive when asynchronously recording AV data received via the internet on an information recording disk.

FIG. 19 illustrates a protocol used between the control section N1 and the disk recording drive N3 in an operation for asynchronously recording AV data received via the internet N10 to the phase change type optical disk N9.

(P301) The recording area searching process by the control section N1 selects a continuous free area for recording an AV file by referring to the file system information which has been previously read out.

(P302) The recording control process by the control section N1 issues a "WRITE & VERIFY AV (ADR2, LEN2)" command, requesting to record AV data to the area selected in (P301). Herein, the parameter ADR denotes the starting address of data recording; and LEN denotes the number of blocks to be recorded. The "WRITE & VERIFY AV" command requests to neglect the defect list and to return the error status and the address information of the defective sector without performing a replacement operation when a defective sector is detected during the recording operation.

(P303) The recording control process by the control section N1 transfers, to the disk recording drive N3, the AV data to be recorded at the "WRITE AV" command.

(P304 to P306) The disk recording drive N3 continuously records AV data in the specified area without referring to the defect list. When detecting a defective sector having an address error, a data error, or the like, during the recording operation for AV data, the disk recording drive N3 does not perform a replacement operation but stops the recording operation, and returns the error status and the defective sector address information to the control section N1.

(P307) The control section N1 stores the address information of the defective sector in the main memory N1d.

(P308 to P309) The recording control process by the control section N1 issues "WRITE & VERIFY AV (ADR3, LEN3)" command, while setting the ECC block following the ECC block including the defective sector as the starting address based on the address information stored in (P308), so as to resend the unrecorded data (including data to be recorded in the ECC block including the defective sector) to the disk recording drive N3.

(P310 to P311) The disk recording drive N3 continuously records AV data in the specified area without referring to the defect list based on the newly-set starting address. When completing the specified data recording operation without an error, the disk recording drive N3 returns a normal completion status to the control section N1.

In advance of the recording operation for AV data described above with reference to FIG. 19, the control section N1 issues a command "READ (ADR1, LEN1)" for requesting to read out the file system information so as to refer to free areas on the phase change type optical disk N9. Herein, the "READ" command requests to read out a number of blocks as specified by LEN starting from the sector having the address specified by the first parameter ADR, while performing a replacement operation using the defect list. When receiving the "READ" command, the disk recording drive N3 reads out the specified file system information referring to the defect list. Thus, when there is a defect block in the area where the file system information is recorded, data reproduction is performed by an ECC unit from an alternate block assigned in a spare area. The disk recording drive N3 transfers the file system information read out from the phase change type optical disk N9 to the control section N1.

After completing the recording operation for AV data described above with reference to FIG. 19, the file system information creation process by the control section N1 registers the ECC block including the defective sector stored in (P307) as a defective extent and continuous areas where AV data of the AV file is recorded as an AV extent. Moreover, in the space bit map, bits for managing the respective sectors in the area, where the defective extent and the AV extent are allocated, are registered as allocated.

The file system information creation process by the control section N1 requests, by a "WRITE & VERIFY (ADR4, LEN4)" command, the disk recording drive N3 to register the file system information updated by the file system information creation process. Herein, the "WRITE & VERIFY" command is a command to verify that the data can be reproduced under a condition more severe than that for normal reproduction after the completion of the data recording operation. The command requests, when a defective sector is detected in both the recording process and the verification process, to register it in the defect list and to perform a replacement process. When there is an ECC block including an already-detected defective sector in the specified recording area, it requests to record the ECC block in the replacement destination and to perform a verification operation for the recorded ECC block. Then, the disk recording drive N3 performs the specified data recording and verification processes while controlling a data recording/verification section N3e with reference to the defect list. After normally processing the "WRITE & VERIFY" command, the disk recording drive N3 returns the normal completion status to the control section N1.

The recording operation for an AV file has been described hitherto. The description of the reproduction operation for the AV file is omitted as it is the same as that in Embodiment 2.

As described above, according to the present embodiment, the recorded sector is tested after AV data has been recorded in order to improve the reliability of the recorded data, whereby it is possible to ensure uninterrupted reproduction of a video or a sound during data reproduction while ensuring the same reliability of data as that ensured by the conventional recording method.

A combination of a control mainly for the disk recording drive (FIG. 16) and a structure of the analog video receiving section and the MPEG encoder (FIG. 15) has been described in Embodiment 2, while a combination of a control mainly for the control section (e.g., a personal computer) (FIG. 19) and a structure of the digital interface and the digital video retrieving section (FIG. 18) has been described in Embodiment 3. However, the present invention is not limited to such a particular system structure. The control mainly for the disk recording drive (FIG. 16) may be combined with the structure of the digital interface and the digital video retrieving section (FIG. 18), while the control mainly for the control section (e.g., a personal computer) (FIG. 19) may be combined with the structure of the analog video receiving section and the MPEG encoder (FIG. 15).

INDUSTRIAL APPLICABILITY

According to the present invention, even if a defective sector is detected while recording AV data, the following ECC block data is recorded while skipping the ECC block including the defective sector. Thus, an access to the spare area is not required at all, whereby it is possible to record in real time AV data to an information recording disk and to continuously reproduce the AV data recorded on the information recording disk.

Moreover, according to the present invention, it is possible to verify whether or not the AV data recorded on the information recording disk has been properly recorded. Thus, it is possible to ensure uninterrupted reproduction of a video or a sound during data reproduction while ensuring the same reliability of data as that ensured by the conventional recording method.

What is claimed is:

1. A recording method for recording data onto an information recording disk including a volume space, comprising:
   determining whether a file is an AV file including AV data;
   when it is determined that the file is the AV file, searching for at least one unrecorded area; and
   recording the AV data in the at least one searched unrecorded area,
   the step of recording the AV data including:
   detecting a defective sector in the at least one searched unrecorded area;
   when the defective sector is skipped, determining whether or not the number of skips in a predetermined area in the at least one searched unrecorded area exceeds a maximum value of an acceptable number of skips in the predetermined area;

when the number of skips does not exceed the maximum value, recording the AV data while skipping the at least one sector including the detected defective sector; and when the number of skips exceeds the maximum value, issuing information indicating that the number of skips exceeds the maximum value.

2. A recording method according to claim 1, further comprising:

when it is determined that the file is the AV file, generating file management information including first location information specifying an AV extent of an area in which the AV data is recorded and second location information specifying a padding extent of an area from an end of the AV extent to at least one boundary of an ECC block; and recording the file management information in the volume space.

3. An information processing system comprising a recording apparatus for recording data onto an information recording disk having a volume space and a control apparatus for controlling the recording apparatus, wherein:

the control apparatus determines whether a file is an AV file including AV data, and when it is determined that the file is the AV file, the control apparatus searches for at least one unrecorded area;

the recording apparatus records the AV data in the at least one searched unrecorded area;

the recording apparatus, for recording the AV data, detects a defective sector in the at least one searched unrecorded area, and when the defective sector is skipped, determines whether or not the number of skips in a predetermined area in the at least one searched unrecorded area exceeds a maximum value of an acceptable number of skips in the predetermined area;

when the number of skips does not exceed the maximum value, the recording apparatus records the AV data while skipping the at least one sector including the detected defective sector; and when the number of skips exceeds the maximum value, the recording apparatus issues information indicating that the number of skips exceeds the maximum value.

4. An information processing system according to claim 3, wherein:

when it is determined that the file is the AV file, the control apparatus generates file management information including first location information specifying an AV extent of an area in which the AV data is recorded and second location information specifying a padding extent of an area from an end of the AV extent to at least one boundary of an ECC block; and the recording apparatus records the file management information in the volume space.

5. A recording method for recording data onto an information recording disk including a volume space, comprising:

determining whether a file is an AV file including AV data;

when it is determined that the file is the AV file, searching for at least one unrecorded area; and recording the AV data in the at least one searched unrecorded area, the step of recording the AV data including:

detecting a defective sector in the at least one searched unrecorded area;

when the defective sector is skipped, determining whether or not the number of skips in a predetermined area in the at least one searched unrecorded area exceeds a maximum value of an acceptable number of skips in the predetermined area; and when the number of skips does not exceed the maximum value, recording the AV data while skipping the at least one sector including the detected defective sector.

6. An information processing system comprising a control apparatus for controlling a recording apparatus for recording data onto an information recording disk having a volume space, wherein:

determining unit operable to determine whether a file is an AV file including AV data;

instructing unit operable to instruct the recording apparatus to search for at least one unrecorded area when it is determined that the file is the AV file; and instructing unit operable to instruct the recording apparatus to record the AV data in the at least one searched unrecorded area;

determining unit operable to determine whether or not the number of skips in a predetermined area in the at least one searched unrecorded area exceeds a maximum value of an acceptable number of skips in the predetermined area when the defective sector is detected in the at least one searched unrecorded area and is skipped.

* * * * *